Figure 1:
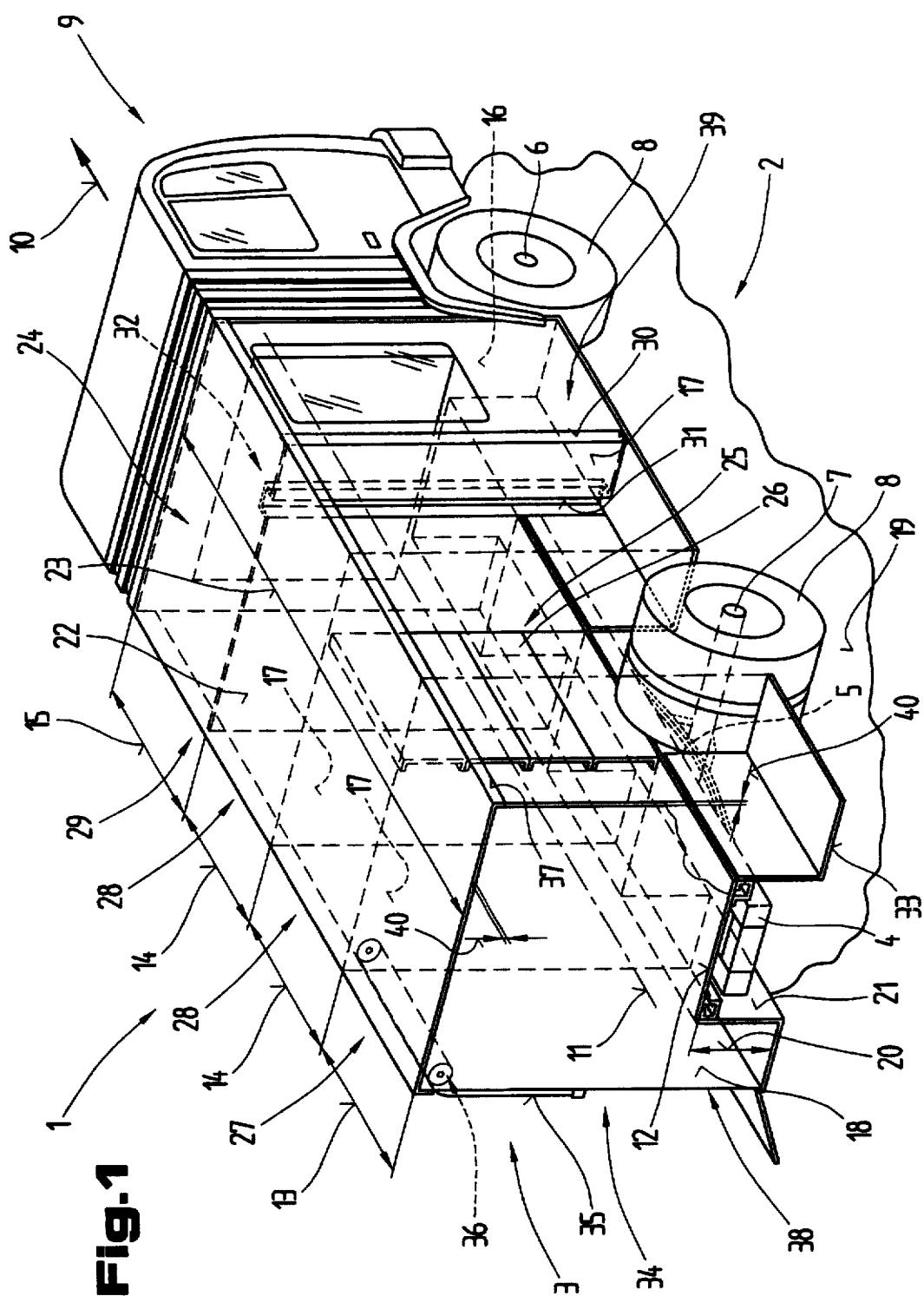

United States Patent [19]

Glatzmeier et al.

[11] Patent Number: 5,785,372

[45] Date of Patent: Jul. 28, 1998

[54] SELF-SUPPORTING BOX STRUCTURE FOR UTILITY VEHICLES PARTICULARLY FIRE-FIGHTING VEHICLES

[75] Inventors: Alfred Glatzmeier, Linz; Franz Hochdaninger, Lauffen, both of Austria

[73] Assignee: Rosenbauer International Aktiengesellschaft, Austria

[21] Appl. No.: 727,592

[22] PCT Filed: Apr. 13, 1995

[86] PCT No.: PCT/AT95/00074

§ 371 Date: Jan. 6, 1997

§ 102(e) Date: Jan. 6, 1997

[87] PCT Pub. No.: WO95/28203

PCT Pub. Date: Oct. 26, 1995

[30] Foreign Application Priority Data

Apr. 13, 1994 [AT] Austria ......................... 768/94

[51] Int. Cl.⁶ ........................................... B60P 3/05
[52] U.S. Cl. ............................... 296/24.1; 296/183
[58] Field of Search ..................... 296/1.1, 24.1, 296/183, 184, 193, 40; 169/62

[56] References Cited

U.S. PATENT DOCUMENTS

| | | | |
|---|---|---|---|
| 1,908,457 | 5/1933 | Swift et al. | 296/183 |
| 2,812,973 | 11/1957 | Pritchard | 296/183 |
| 3,572,815 | 3/1971 | Hackney . | |
| 5,076,639 | 12/1991 | Jewett et al. . | |

FOREIGN PATENT DOCUMENTS

| | | |
|---|---|---|
| 394832 | 12/1991 | Austria . |
| 0125234 | 11/1984 | European Pat. Off. . |
| 0541485 | 5/1993 | European Pat. Off. . |
| 2332926 | 6/1977 | France . |
| 2043794 | 4/1971 | Germany . |
| 2741126 | 3/1979 | Germany . |
| 3517290 | 11/1985 | Germany . |
| 4024493 | 2/1992 | Germany . |
| 941747 | 11/1963 | United Kingdom . |
| 1127915 | 9/1968 | United Kingdom . |
| 2081331 | 2/1982 | United Kingdom . |
| 2158783 | 11/1985 | United Kingdom . |

OTHER PUBLICATIONS

International Search Report dated Jul. 31, 1995.

*Primary Examiner*—Stephen Avila
*Attorney, Agent, or Firm*—Ratner & Prestia

[57] ABSTRACT

The invention describes a self-supporting box structure (3) for utility vehicles (1) particularly firefighting vehicles, for accommodating life-saving and/or firefighting devices and if necessary extinguishing substances and/or pumps for extinguishing substances, in a plurality of equipment boxes or compartments (27, 28) accessible from the outside through various door arrangements (34). The self-supporting box structure (3) has a horizontal support panel (12), which is formed in a plane perpendicular to a vehicle longitudinal axis (11) with a substantially U- or hat-like profiled cross-section. On this horizontal support panel (12) in the direction of the vehicle longitudinal axis (11) and at a spacing (13 to 15) from one another and perpendicular thereto there are arranged at least three transverse support elements (16 to 18), which project in the direction of a support surface (19) by a length (20) of the arms (21) of the U-shaped profiled cross-section of the horizontal support panel (12). The transverse support elements (16 to 18) and the horizontal support panel (12) are formed by at least one panel-shaped component.

60 Claims, 12 Drawing Sheets

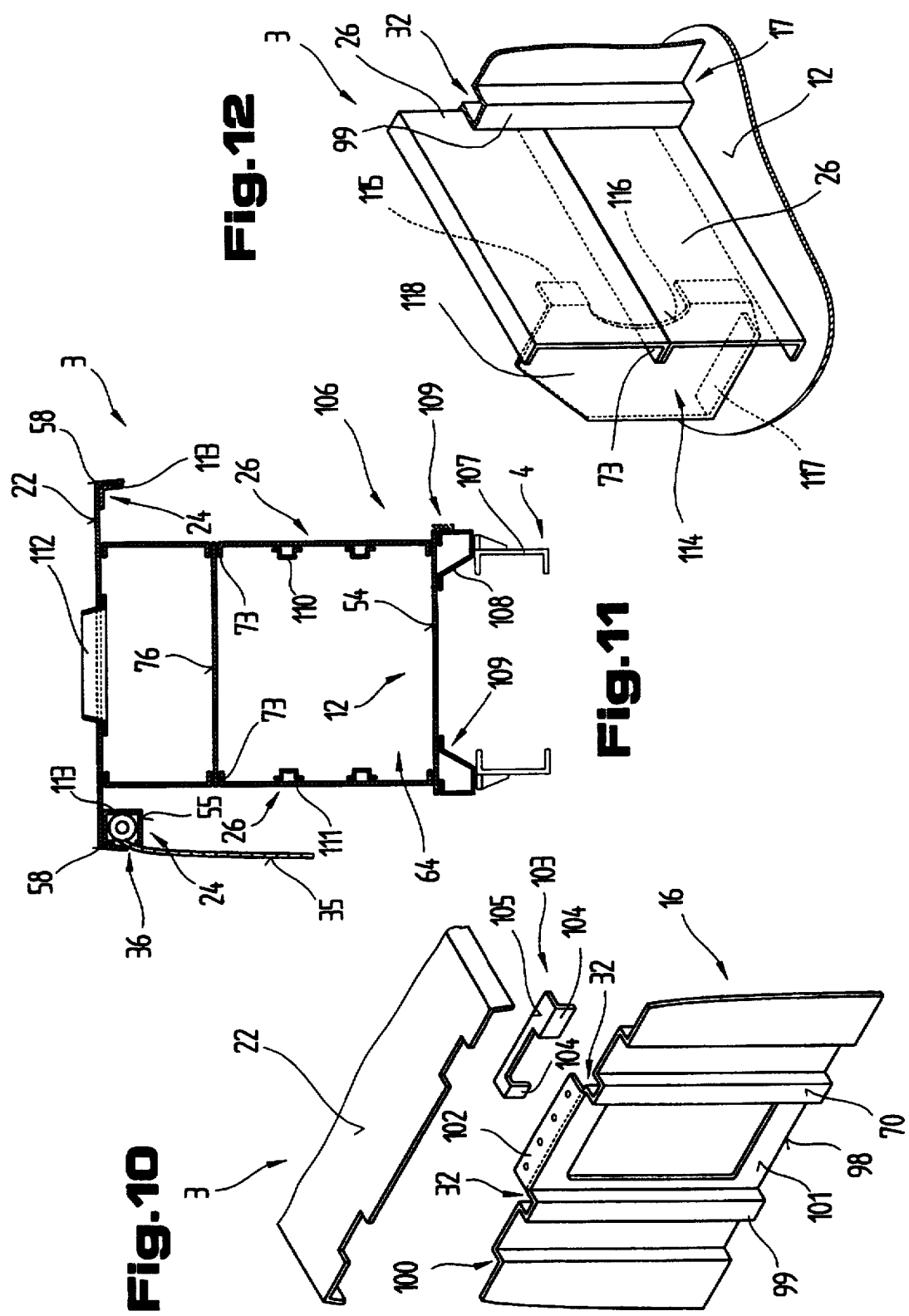

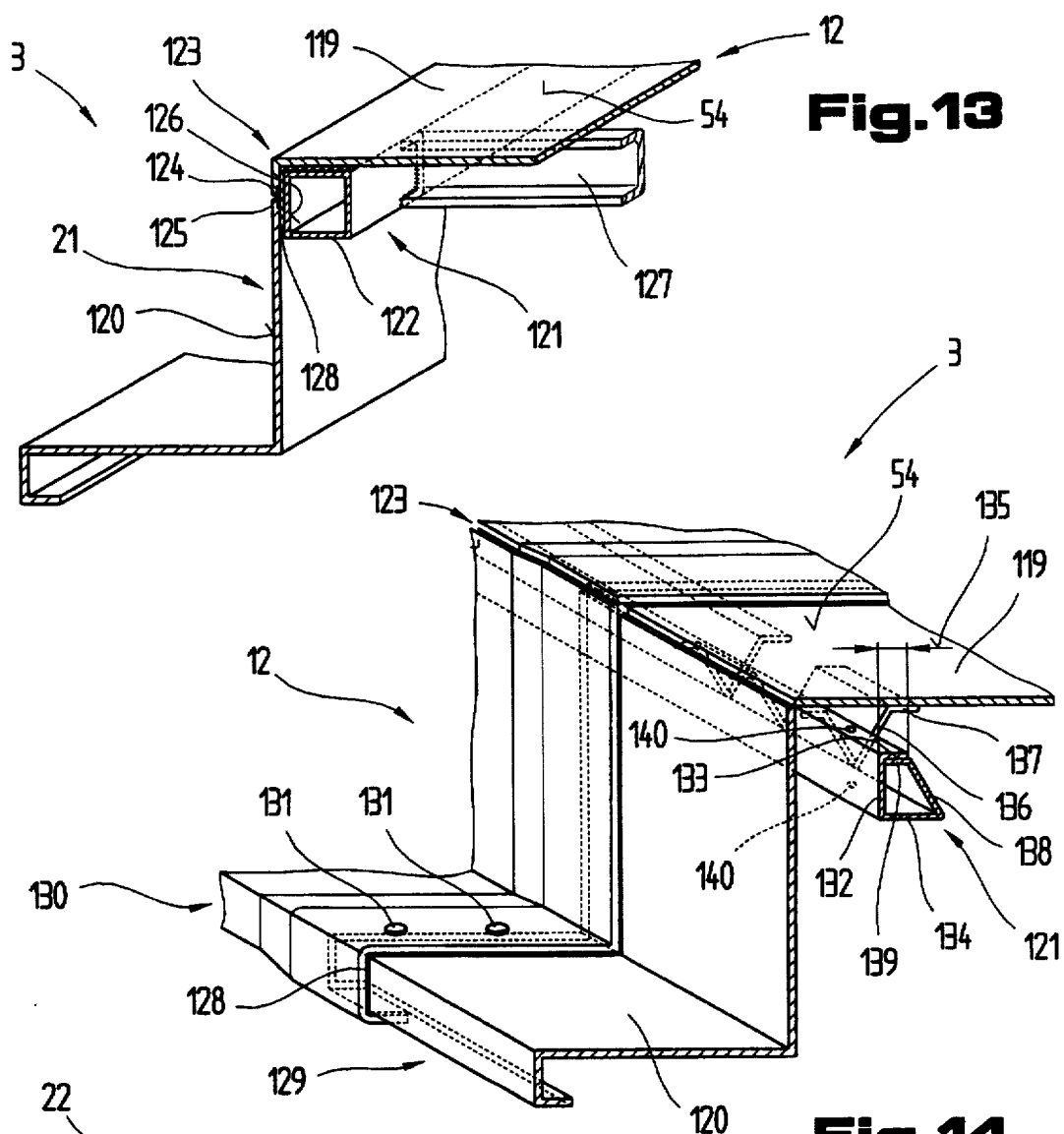
Fig.13
Fig.14
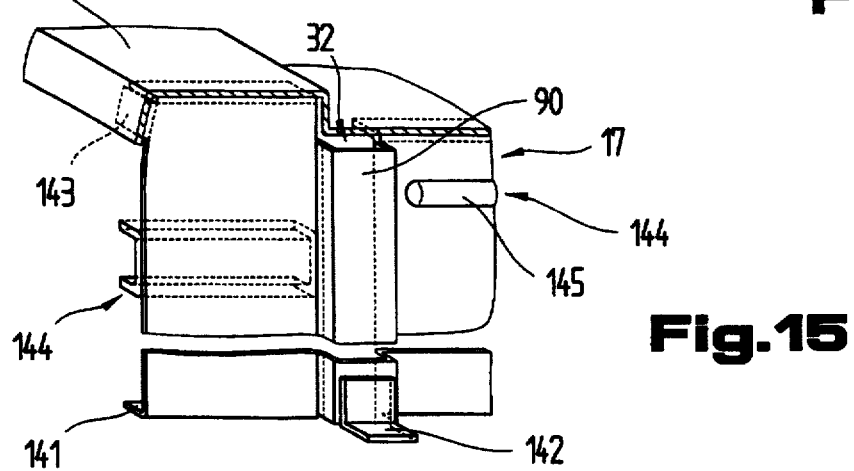
Fig.15

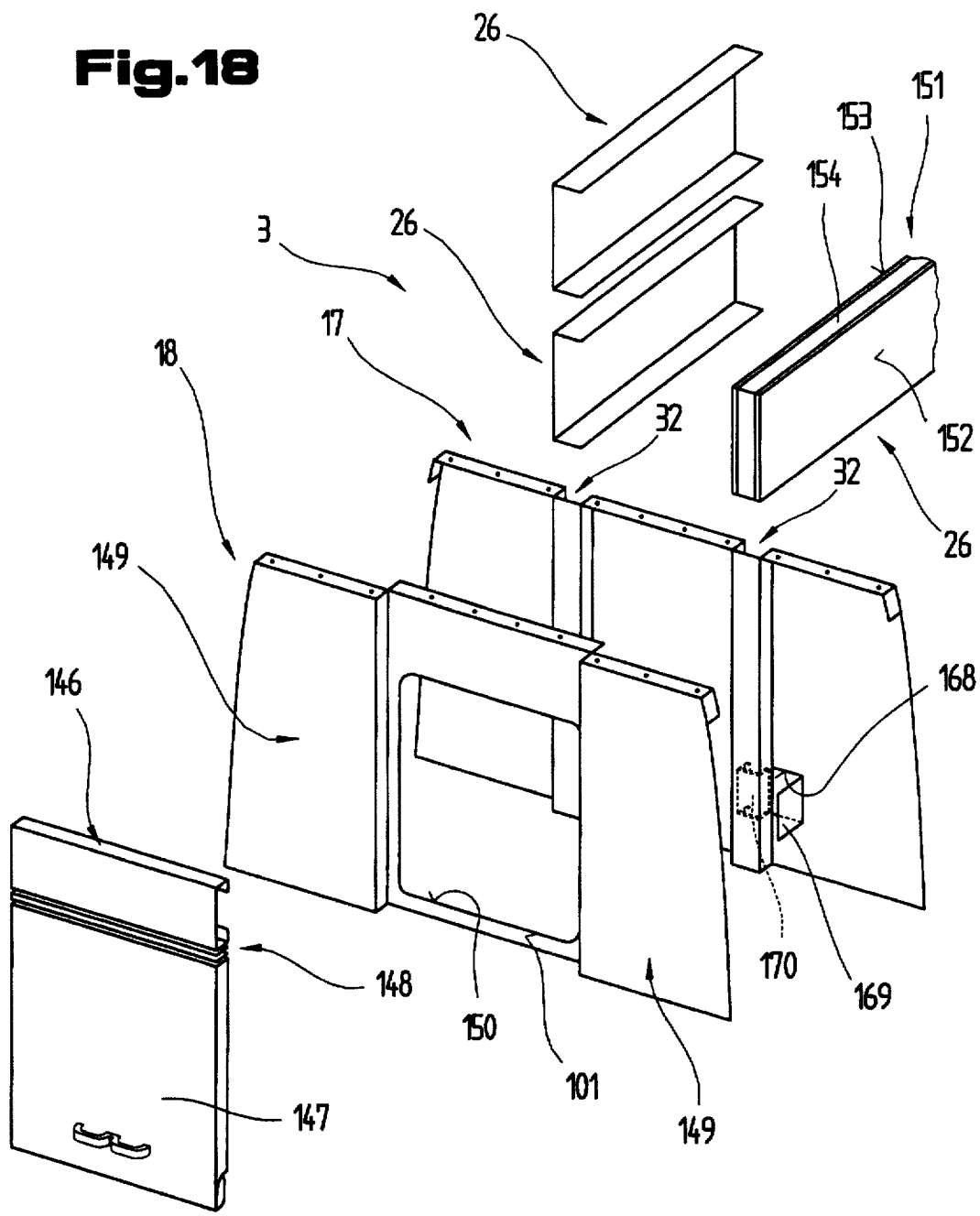

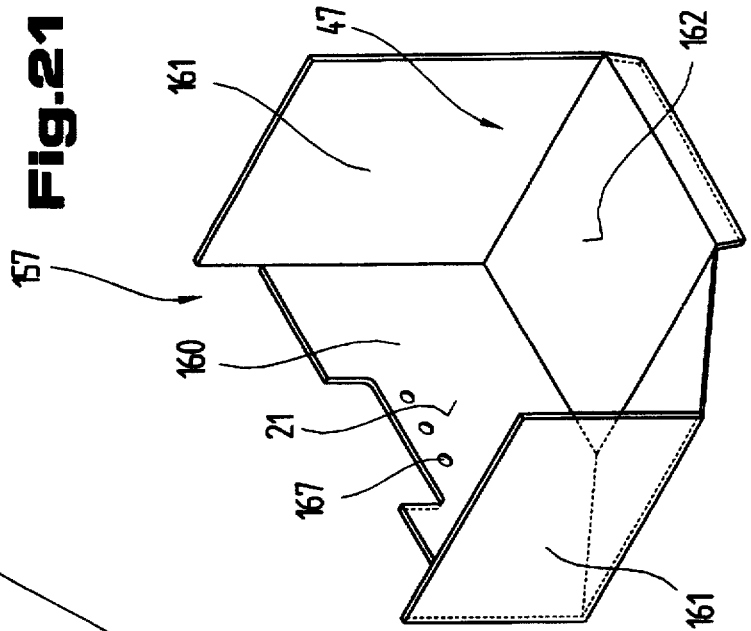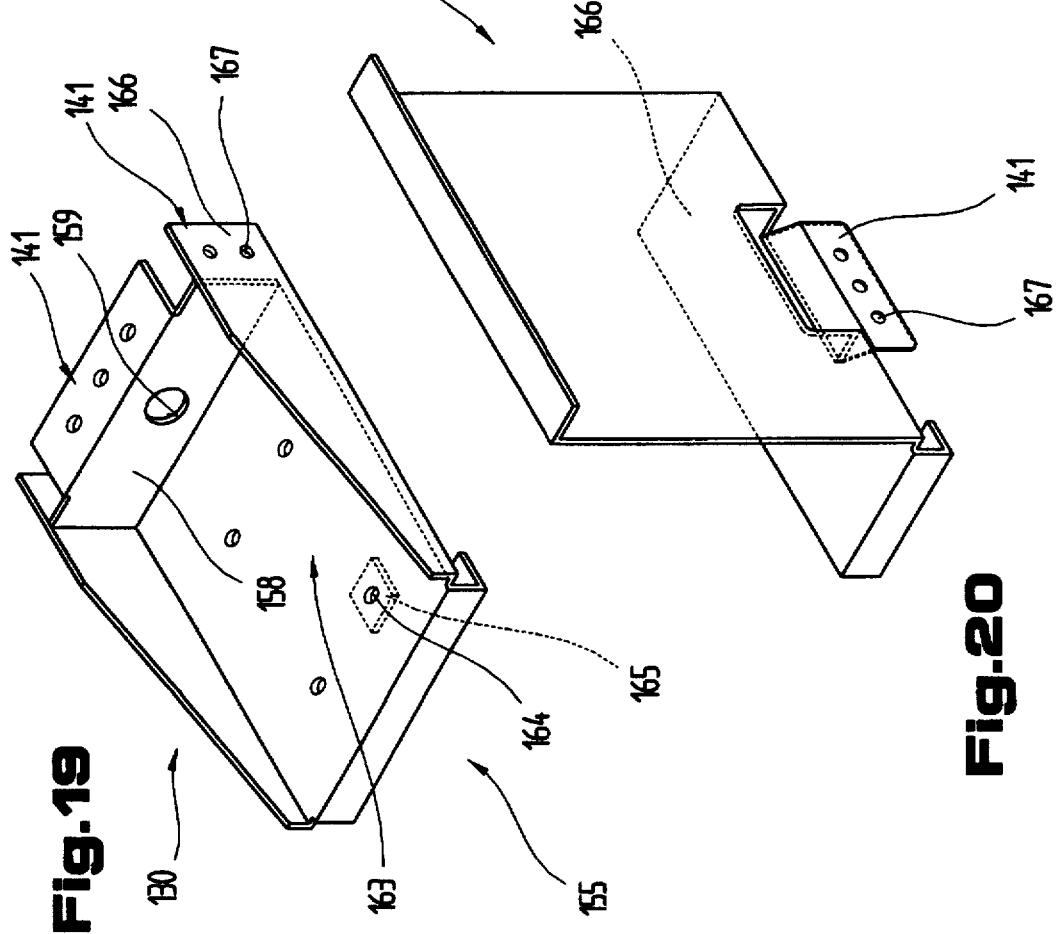

SELF-SUPPORTING BOX STRUCTURE FOR UTILITY VEHICLES PARTICULARLY FIRE-FIGHTING VEHICLES The invention relates to a self-supporting box structure for utility vehicles as described in the preamble of claim 1.

Such utility vehicles are already known, according to DE-C-35 17 290, in which the equipment cab and/or the driver's cab and if necessary the fire-extinguishing substance agent container are designed as independent modules with fixed dimensions, and the various optional modules can be assembled to form a utility vehicle. The individual modules are rigidly yet interchangeably interconnected, and the modules or sub-assembly modules or the support frames are provided with co-operating coupling parts of similar connecting devices. Each of these modules preferably has a support frame with standardized dimensions of width, height and depth, and said modules form container-like units, which are interconnected by the similar coupling and connecting devices and are connected to form a complete box structure. This type of box structure permits a rapid and free assembly of variously fitted equipment cabs. It is however necessary to provide each module with a self-supporting support frame, whereby the empty weight of such a box structure is relatively high for a utility vehicle, so that its use is only of advantage for special service requirements in which under certain circumstances, due to rapidly-changing conditions of use, it is necessary to assemble said box structures rapidly and in various ways according to the requirements of use.

The objective of the present invention is to create a self-supporting box structure for a utility vehicle, particularly a firefighting vehicle, which is designed to be self-supporting and permits a large number of embodiment variants for the equipment cab, which are then not further altered in operation.

This objective of the invention is achieved by the features of the characterising part of claim 1. The advantage here is that by the manufacture of a self-supporting box structure and by the use and assembly of various sheet metal elements, a generous variation for the design of the box structure is possible using a plurality of identical parts, and the sub-divisions required in such a box structure simultaneously take over a support function, so that a support framework made of tube sections can be omitted. Thus it is possible to use knowledge gained from the construction of cars relating to such self-supporting cabs, for the production of complex box structures for utility or firefighting vehicles, so that in this way the advantages of strength with simultaneous weight reduction can now be realised in trucks. In addition, by means of the combination of the horizontal support element with the transverse support elements and the diagonal support elements made of profiled sheet metal, using correspondingly profiled sheet metal parts a framework-like support structure can be obtained which can resist even higher torsional forces when travelling off-road and permits the storage even of heavy pieces of equipment at any point inside the box structure. Simultaneously by means of this useful combination of the individual support elements it is achieved that a fire-extinguishing substance container can be integrated in the interior of such a box structure with identical or similar components. Thus it is possible to use the same constructive system for the box structure both for auxiliary vehicles and for pump water tenders, whereby the universal utility of this constructive principle can be increased further.

An embodiment according to claim 2 is also advantageous as because of the design of sheet metal parts, made of either aluminium or steel, and their suitable interconnection, a self-supporting structure can be produced from these parts alone.

A further development is however possible according to claim 3, as thereby also planar honeycomb elements with a high resistance to buckling and low weight can be provided, whereby integration, for example of a liquid tank, is simplified in such a structure.

In a further development according to claim 4, without a large requirement of space, a rigid box structure is achieved, whereby a free design of the interior space of the box structure can be achieved.

Another embodiment variant is also possible according to claim 5, according to which a connection between a driver's cab and the self-supporting box structure is made possible in a simple way. This design makes it possible to arrange seats or benches for the crew in a part of the self-supporting box structure associated with the driver's cab, and to use this part of the box structure as a crew cab.

A design according to claim 6 permits a simple closure of the transitional area between the driver's cab and the box structure.

A reinforcement of the horizontal support element, and a solid connection between the transverse support elements and the horizontal element or the roof support panel are achieved by features in claim 7. Moreover, such a design permits a large-area transmission of forces from the thrust forces acting on the transverse support elements, for example during acceleration and braking, into the horizontal element or the roof support panel.

Claim 8 describes a further design, by means of which sufficient reinforcement of the box structure is achieved, whereby the reinforcing element can simultaneously form the diagonal support element, and therefore a box structure with charging freedom can be created at right angles to the longitudinal direction of the vehicle.

By means of the variant according to claim 9, an individual adjustment of the strength values of the individual areas in the box structure can be achieved in a simple and cost-effective manner.

A further development according to claim 10 proves advantageous, as a simple connection can be achieved between the reinforcing elements and the portions of the box structure to be reinforced. A further advantage is that in this way also a prefabricated box structure can if necessary at any moment subsequently be reinforced in individual areas and adapted to varying stresses.

An embodiment variant according to claim 11 proves advantageous for achieving basic rigidity or strength of a box structure. In this way the existing planar sheet metal elements can be provided with sufficient resilience to buckling and bending without the necessity for additional components or connecting work.

By means of the embodiment according to claim 12 a reinforcement that is uniform over the length of the box structure is achieved, whereby an approximately uniform distribution of weight with respect to the rear axle is also achieved in a simple way.

It is also possible by means of the embodiment according to claim 13 to achieve sufficient reinforcement of the rear wall of the box structure and to permit a planar design thereof, simultaneously using the same construction principle in the region of the rear wall as in the other part of the box structure.

Of advantage however is an embodiment variant according to claim 14, as thereby additional reinforcing elements in the region of the front edges of the transverse support elements can be omitted as the lateral guide tracks needed for roller shutter arrangements can be used for this purpose.

An additional reinforcement of the transverse support elements can in many cases be avoided if the latter are designed in accordance with claim 15. In addition, in connection with these groove-like continuous guiding or reinforcement areas, a sub-division of the transverse support elements is possible, so that these can also be assembled from a plurality of individual parts to form a complete component.

By means of the design according to claim 16 a similar securing or insertion of vertical separating elements for sub-dividing the box structure into various areas is achieved in a simple way. Particularly when the lateral surfaces of the groove-like guiding or reinforcement areas are aligned towards one another, support of the vertical separating elements in the transverse support elements is considerably simplified, and by guidance of the vertical support elements in the groove-like recesses, high lateral forces can be applied in this area to the transverse support elements. Thus this embodiment is particularly suitable for the integration of a tank into the box structure.

By means of the further development according to claim 17, the areas of the transverse support element adjacent to the stable guiding or reinforcement areas can also be provided with increased dimensional stability, the extensions being usable simultaneously to produce correspondingly rigid nodal connection points between the transverse support element and the base or roof support panel.

An embodiment variant according to claim 18 also proves advantageous, as thereby the transverse support elements can be secured against tilting in a simpler way in their built-in position, and thus the securing and assembly procedure can be simplified.

By means of a further design according to claim 19, the vertical separating elements can take over the function of the diagonal support element, so that the separate arrangements of diagonal support elements is unnecessary.

Above all, by means of a further development according to claim 20 a connection between the vertical separating elements and the transverse support elements cam be made which, for example in the case of a resilient adhesive connection, can compensate for a certain flexibility and relative movement between these individual elements caused above all by thermal expansion or the like.

The further embodiment variant according to claim 21 permits a universal adjustment of the design of the connection between the individual transverse support elements, as a mixture of the variously-shaped vertical separating elements is possible at any time due to a corresponding vertical grid.

By means of the features according to claim 22 a sufficient basic rigidity of a component made from a plurality of vertical separating elements is achieved, i.e. for example the lateral walls of a tank container or a separating wall, without additional reinforcing elements.

In order to achieve an even greater surface load capacity of the vertical separating elements, the latter can be provided in addition with reinforcing elements according to claim 23; whereby in this case it is advantageous to use reinforcing elements according to the details in claim 24.

By means of the embodiment variant according to claim 25, even with correspondingly large spans between two transverse support elements, sufficient rigidity can be achieved for a partition wall formed by vertical separating elements.

A further embodiment according to claim 26, is also advantageous as thereby an exact positioning of two immediately adjacent vertical separating elements can be ensured, so that even with varying degrees of stress, as is for example the case with a tank container in which the fluid flows to and fro during a journey, a sealed connection between the vertical separating elements can be ensured.

In order to connect mutually-adjacent vertical separating elements and to secure them in a fixed position it is advantageous to select a design according to claims 27 and 28.

The manufacture of the horizontal support element is simplified by an embodiment variant according to claim 29.

A rigid connection of the individual parts of a horizontal support element transmitting high forces can be achieved by the further development according to claim 30.

The design according to claim 31 is also advantageous, as in this way the horizontal support element can simultaneously take over the function of an auxiliary frame for the box structure, whereby the connecting stresses acting on the box structure can be further reduced.

A design of a nodal reinforcing element as characterized in claims 32 to 34 also proves advantageous, as in addition to a high rigidity of the nodal reinforcing element, a rapid and cost-effective connection can also be produced between the horizontal support element and the vehicle frame of the vehicle.

A connecting technology favourable for high torsional stresses and high vibratory stresses is achieved by the design according to claim 35, as in this way high-frequency vibrations can be absorbed and damped by the permanent elasticity of the adhesive layers, without the connecting points being destroyed.

Also of advantage is a connecting technology as protected in claim 36, as thereby, over a long operative period and with high external temperatures, a permanent rigid securing can be achieved, which is subjected to less ageing and deformation stresses, particularly by creep.

A simple separation of the box structure in a horizontal plane can be achieved by the designs of claims 37 and/or 38.

The further developments according to claims 39 and/or 40 allow a versatile design of the interior space of such a box structure for tanks with various loading capacities.

Further advantageous designs of the horizontal support elements are described in claims 41 to 43.

Sufficient reinforcement with a low extra outlay on components is achieved by the embodiment variant according to claim 44, as the longitudinal support element usable for housing the roller shutters in a torsion-proof manner can simultaneously be used to reinforce a roof support panel which is in fact self-supporting, but not self-contained.

A simple structure of the securing of the driver's cab and of the box structure is achieved by the design according to claim 45, as in such a design an alteration and reconstruction of the usually resilient connection and suspension of the driver's cab on the vehicle frame is not necessary.

Also of advantage is a design according to claim 46, as thereby over-stressing of a rotating resilient connection element between the driver's cab and the crew cab can be prevented even when there are intense relative movements between them. Moreover, when stationary, a predetermined relative position between the driver's cab and the crew cab is ensured, so that even in the case of long stationary periods, as is in particular the case with utility vehicles of the fire brigade, no permanent deformations of the connecting element can occur which can influence the seal between the individual parts.

Also advantageous is a design according to claim 47, as thereby a superficial connection, even with small displacement paths, and a three-dimensional displacement of the driver's cab relative to the box structure can be achieved.

The advantage in a design according to claim 48 is that, by means of the lateral strip, the connecting element can be reverse-turned by a corresponding retaining strip, and thus a moisture-proof seal can be ensured between the box structure and the driver's cab even when there is extremely strong relative displacement between the two parts.

By means of the further development according to claim 49 it is achieved that both during driving operations and above all when stationary, automatic alignment of the driver's cab and of the crew cab is achieved in a predetermined neutral position, so that undesirable distortions of the connecting element and thus any eventual lack of sealing can be avoided in the transitional area between the driver's cab and the box structure.

Also of advantage is a design according to claim 50, as thereby, in the case of three-dimensional displacements, the displacement movement is damped by the resilient deformation of one or of both guiding or damping elements, and an automatic restoring to the neutral position is effected.

By means of the further development according to claim 51, the relative movement between the driver's cab and the crew cab in the longitudinal direction of the vehicle can also be restricted by the run-up of the conical surfaces of the inner and outer guiding or damping element.

By means of a further design in claim 52, a speech connection is provided which is very important for utility vehicles, and personal contact is afforded between the persons in the driver's cab and in the crew cab, as according to experience this permits a considerable relaxation in the nervous tension of the crew which exists during the drive to the site of the operation.

Also of advantage is an arrangement of the boarding ladders according to claim 53, as thereby, even when the crew cab is in an extremely high position due to the high frame height and the off-road driving properties described above of such utility vehicles, this considerably simplifies boarding and alighting from the crew cab even when wearing heavy apparatus on the back, for example breathing apparatus.

By means of a design according to claim 54, the cavity located between the outer limits and the door arrangement, provided by the corresponding design of the horizontal support element, can be used for the arrangement of the boarding ladder.

Also of advantage is an embodiment variant according to claim 55, as thereby even box structures using the advantages according to the invention can be manufactured, which do not require a total-area sub-division of the box structure.

The design according to claim 56 permits in a simple way the use of specially-formed components within such a box structure, which is combined in a box fashion from a maximum number of similar components, said special components being already correspondingly prepared for attachment and disposition of predetermined pieces of equipment, so that complex incorporations of stiffening and reinforcing elements for mounting heavy pieces of equipment, such for example as pumps and the like, can be omitted.

By means of the embodiment according to claim 57, a simple production of the horizontal support element is permitted even in the case of large constructive lengths, achieving a high degree of rigidity and strength mainly in the connection area between the transverse support elements and the horizontal support element.

The features of claims 58 and 59 are advantageous for the attachment, in particular of the pivot axis of a pivoting compartment or other pieces of equipment.

It is of advantage in the design according to claim 60 that even heavy equipment and constructive elements of the box structure accommodating them, which are subject to buckling or deformation, can be mounted in the box structure without substantial reinforcement, as the forces which usually occur at points can be transmitted via the profiles or lateral strips over a larger surface into the usually thin-walled sheet metal parts of the box structure.

Figure 2:
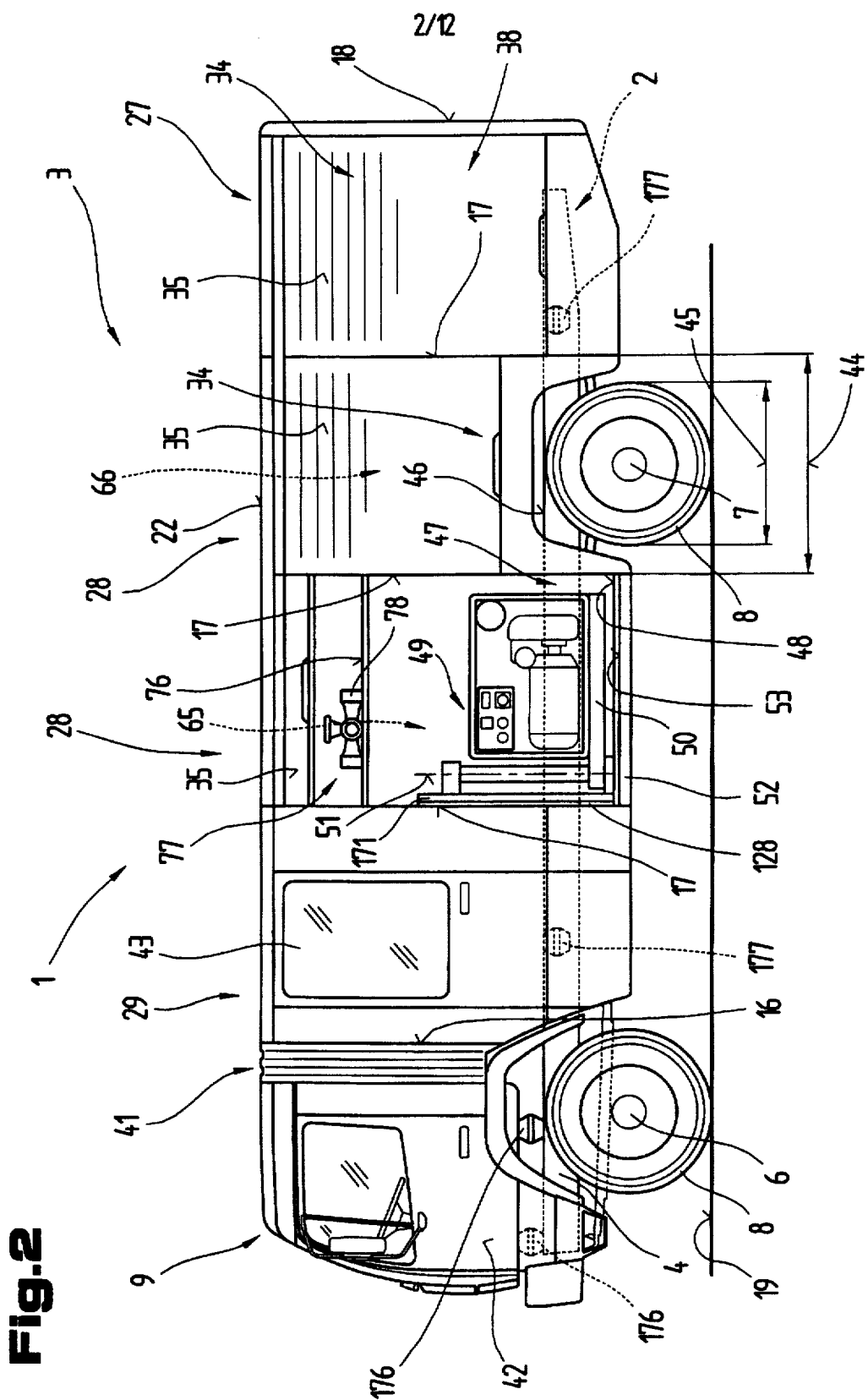
Figure 3:
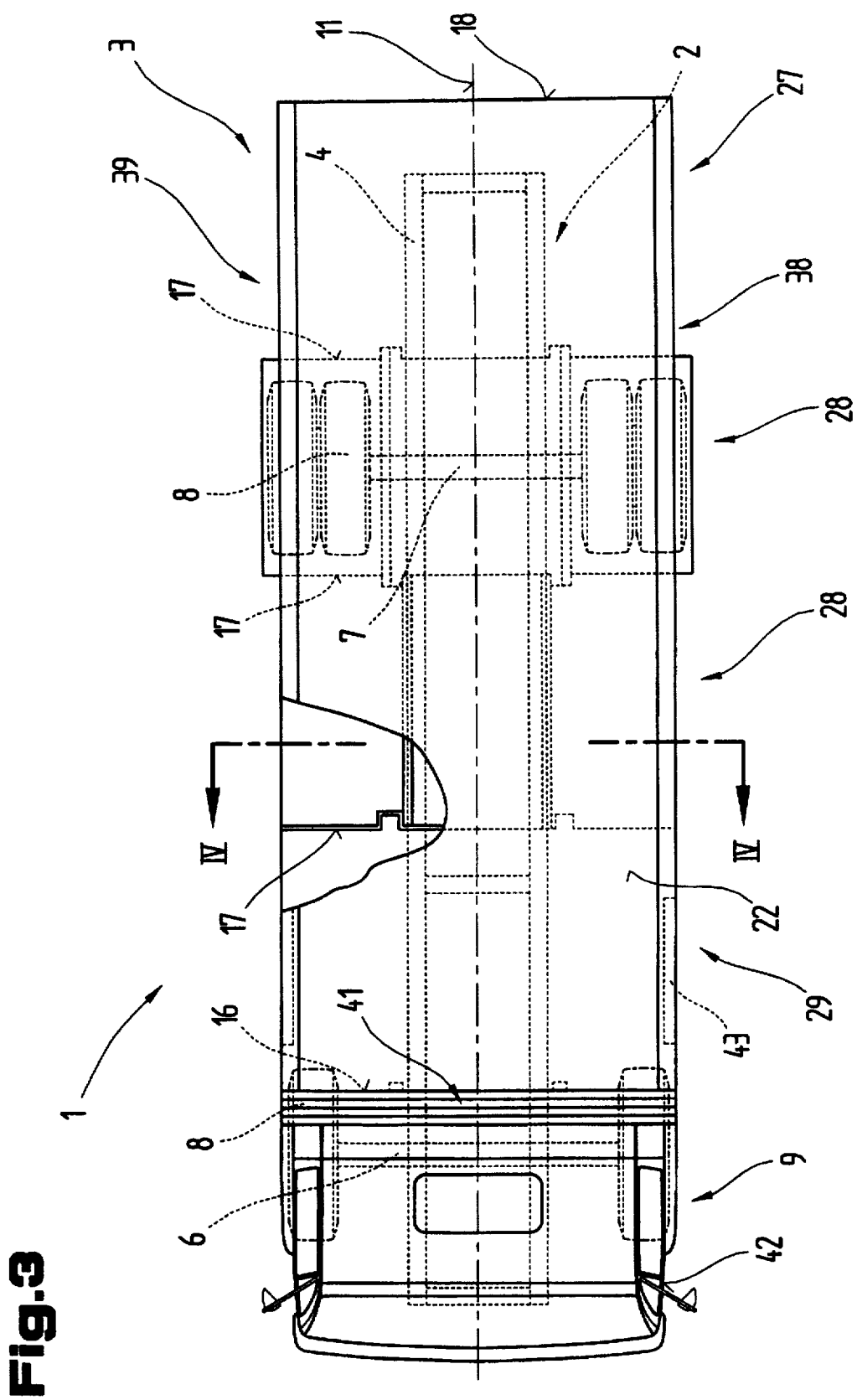
Figure 4:
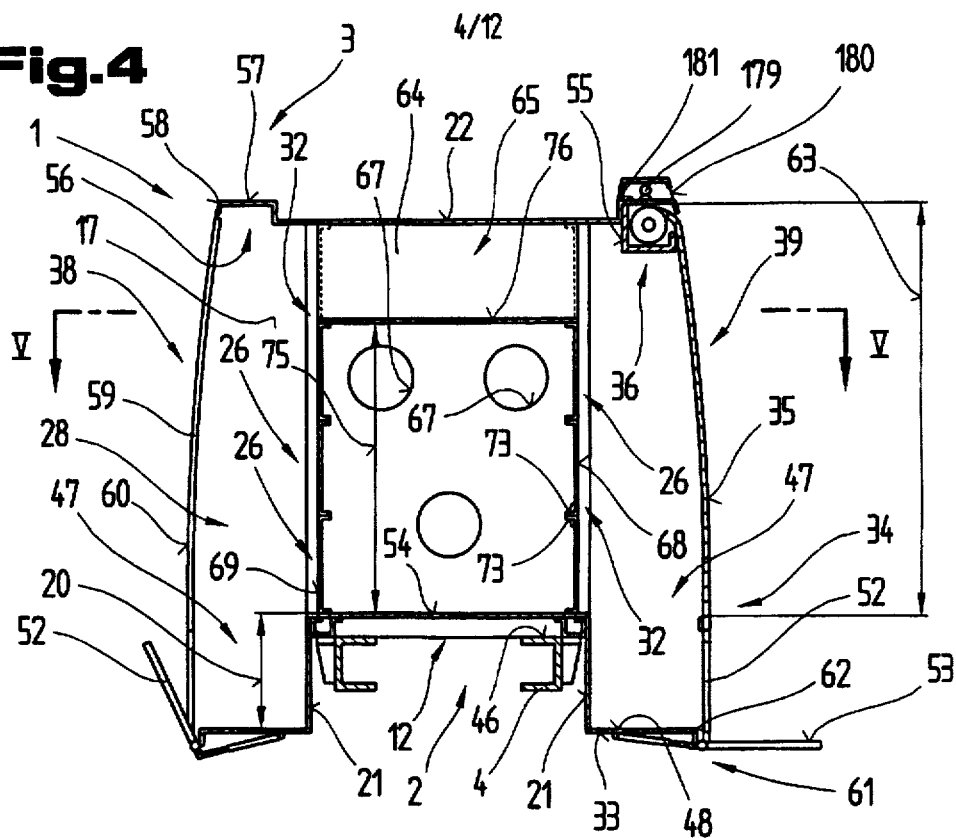
Figure 5:
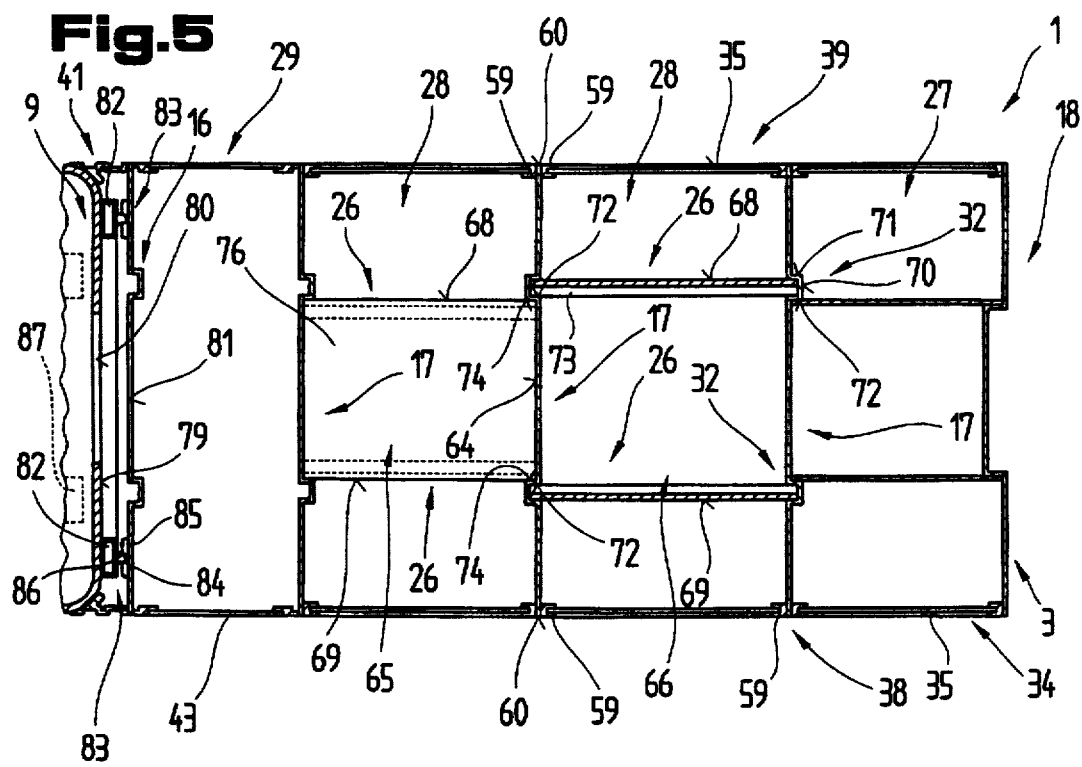
Figure 6:
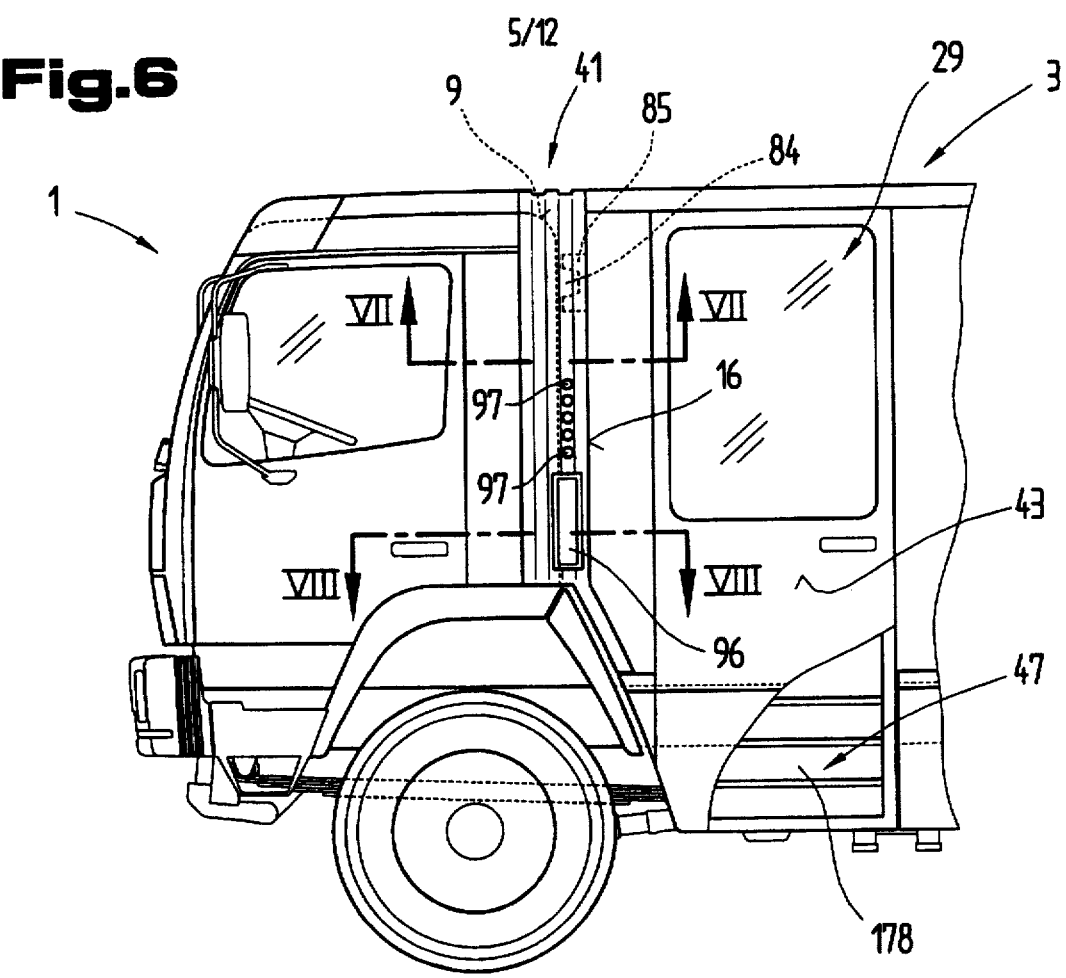
Figure 7:
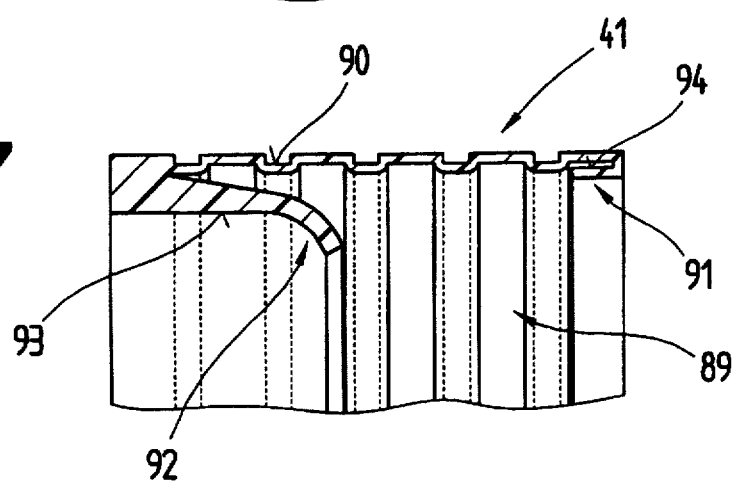
Figure 8:
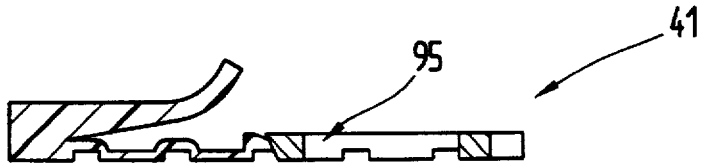
Figure 9:
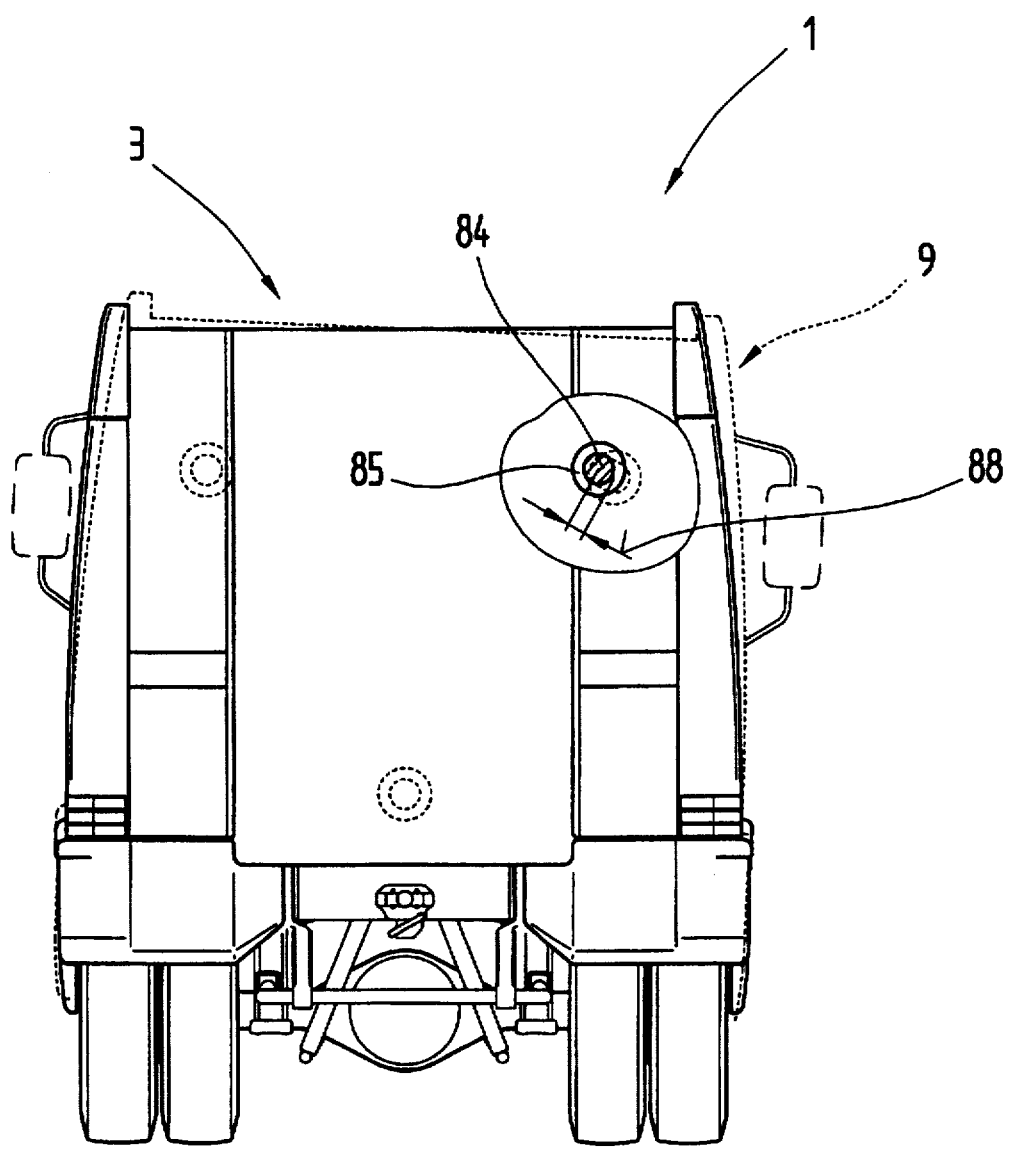
Figure 17:
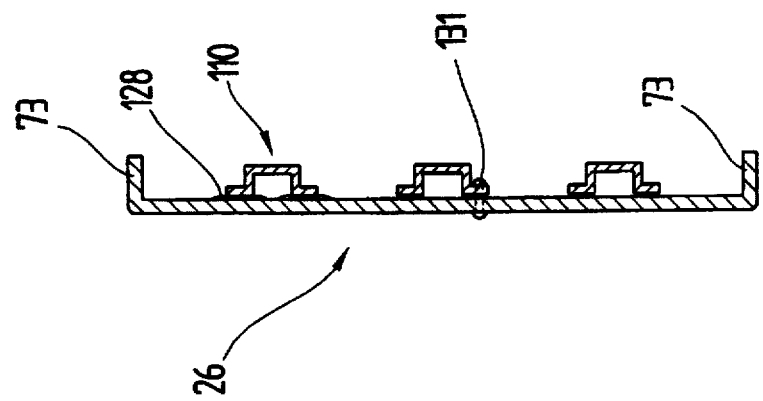
Figure 16:
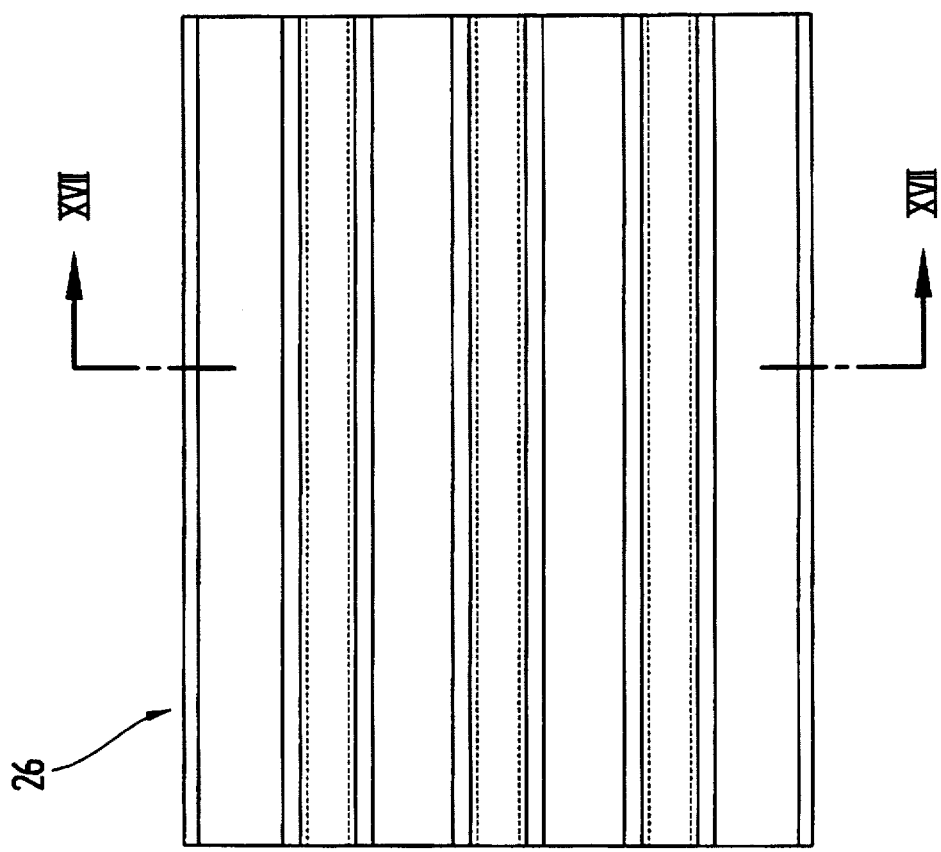
Figure 22:
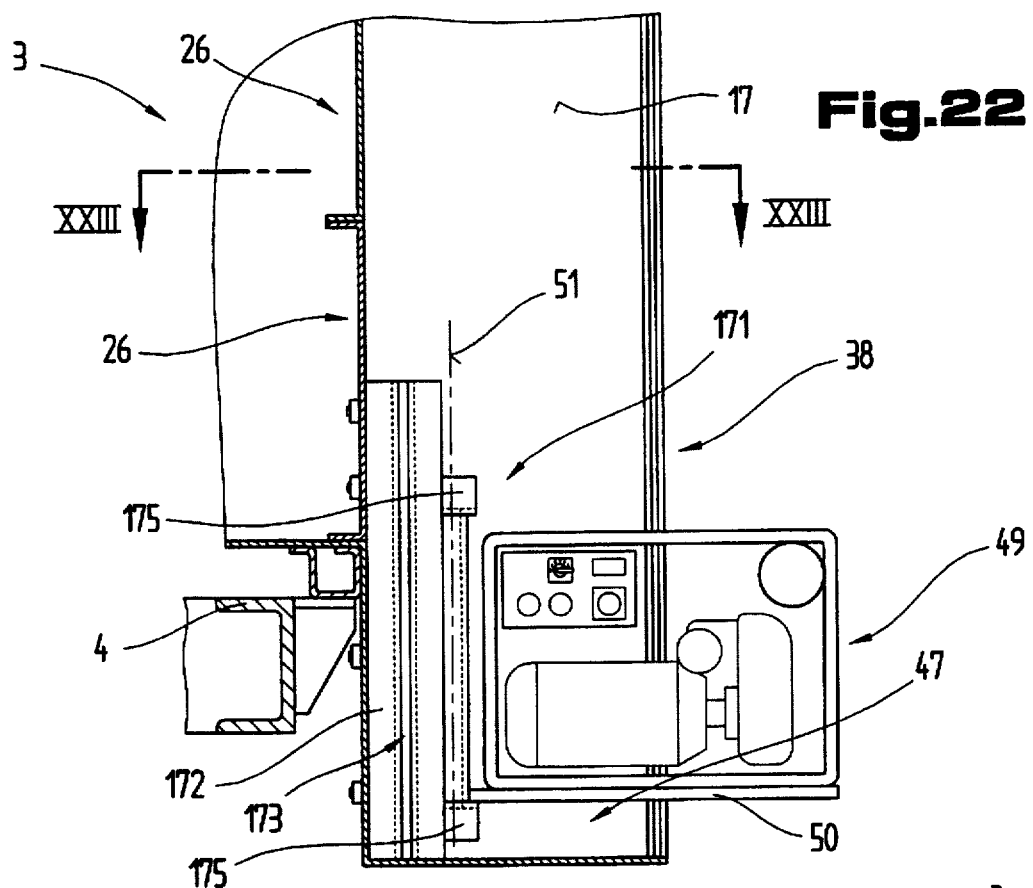
Figure 23:
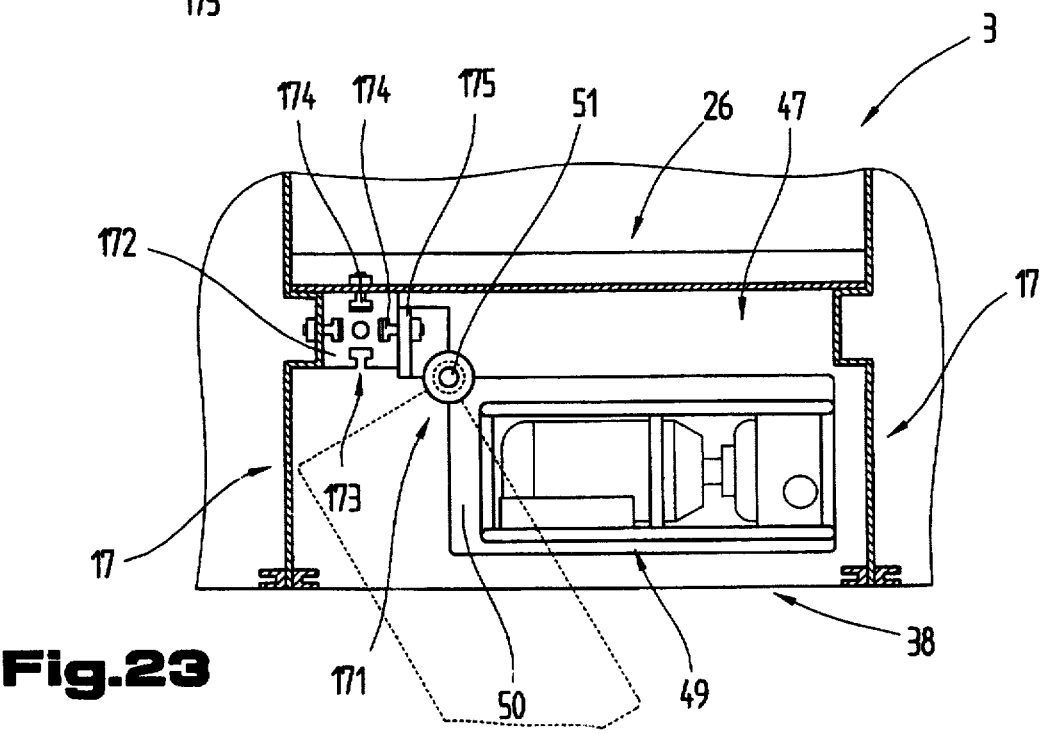

The invention is now explained in more detail in the following with reference to embodiments given by way of example and shown in the drawings, which illustrate:

FIG. 1 a simplified, schematical, diagrammatic view of a utility vehicle with a box structure according to the invention as an outline illustration;

FIG. 2 a side elevation of the utility vehicle with a box structure according to the invention with door arrangements in the side walls partly open;

FIG. 3 a plan view of the utility vehicle, according to FIG. 2, in partial section;

FIG. 4 the utility vehicle according to FIGS. 2 and 3 in front elevation, in section along the lines IV—IV in FIG. 3;

FIG. 5 an embodiment variant of the box structure according to the invention in plan view, in section along the lines V—V in FIG. 4 and in a simplified diagrammatic view;

FIG. 6 a part of the utility vehicle in the region of the transitional and sealing element between the driver's cab and the box structure in side view and simplified diagrammatic illustration;

FIG. 7 the connecting element between the driver's cab and the box structure in front elevation, in section along lines VII—VII in FIG. 6;

FIG. 8 the connecting element in the region of the cover for the operating equipment displays in front elevation, in section along lines VIII—VIII in FIG. 6;

FIG. 9 the utility vehicle in front elevation with the driver's cab displaced relative to the box structure in a simplified schematic, diagrammatic view;

FIG. 10 a nodal connection between a transverse support element and the roof support panel in a simplified, schematic, diagrammatic view;

FIG. 11 another embodiment of the box structure in the region of a container for extinguishing substance in front elevation, in section;

FIG. 12 the arrangement of splash walls in a container for extinguishing substance formed by parts of the box structure according to the invention, in diagrammatic view;

FIG. 13 a corner nodal design of the horizontal support element between the base and the arms of the latter in a simplified diagrammatic view in partial section;

FIG. 14 a further embodiment variant of the horizontal support element in a simplified pictorial view, partly in section;

FIG. 15 a corner nodal design between the roof support panel and the transverse support elements in a simplified pictorial view in partial section;

FIG. 16 a vertical separating element in side view;

FIG. 17 the vertical separating element according to FIG. 16 in front elevation, in section along lines XVII—XVII in FIG. 16;

FIG. 18 a possible variant of a transverse support element with the associated incorporated parts in a diagrammatic schematically simplified explosive view;

FIG. 19 a variant of a shaped component for a box body according to the invention in diagrammatic view;

FIG. 20 an embodiment of a shaped body component for a box structure according to the invention in diagrammatic view;

FIG. 21 an embodiment of a shaped component for a box structure according to the invention in diagrammatic view;

FIG. 22 a portion of a box structure in front elevation, in section and in simplified enlarged view;

FIG. 23 a part of the box structure according to the invention according to FIG. 22 in plan view and simplified schematic view, in section along the lines XXIII—XXIII of FIG. 22.

FIG. 1 shows a utility vehicle 1, which in the present case is designed as a firefighting vehicle. In order to house life-saving and/or extinguishing devices not shown in more detail and if necessary extinguishing substances or pumps for extinguishing substances, a box structure 3 is disposed on a vehicle chassis 2. The vehicle chassis 2 is formed by a vehicle frame 4, which is supported by corresponding spring elements 5 on vehicle axles 6 and 7 with wheels 8, and on which a driver's cab 9 is also secured.

The box structure 3 is mounted on the vehicle frame 4 along a vehicle longitudinal axis 11 in a direction of the driver's cab 9 opposite to the direction of travel, arrow 10, and comprises a horizontal support element 12 and at least three transverse support elements 16, 17 or 18, disposed one behind the other at spacings 13, 14, 15 in the direction of travel, arrow 10.

The horizontal support element 12 has, in the direction of a support surface 19, arms 21 projecting by a length 20 which form a U-shaped profiled cross-section.

The horizontal support element 12 and also the transverse support elements 16 to 18 comprise sheet metal parts, in particular made of steel and/or aluminium.

Mounted on the transverse support elements 16 to 18 opposite the support surface 19 is a roof support panel 22. Said roof support panel 22 and/or the horizontal support element 12 connect the transverse support elements 16 to 18 and over a certain constructive length 23, form a longitudinal support element 24.

By means of additional diagonal support elements 25, which are disposed by vertical separating elements 26, for example panel-shaped or sheet metal elements in the form of compartment bases, in the direction of travel, arrow 10, or extending parallel preferably to the vehicle longitudinal axis 11, i.e. in the longitudinal direction of the vehicle frame 4, between the transverse support elements 16 to 18, achieving a further increase in the stability of the box structure 3.

In this way a self-supporting box structure 3 is created which for example can be mounted on or removed from the vehicle frame 4 at any time for example in the fashion of a pre-fabricated tipper tub.

This means that this box structure 3, formed substantially only from sheet metal elements, is intrinsically rigid and is capable of supporting in a torsional-and-deformation-free manner both its own weight and also the vertical loads arising on loading or other stresses, and transferring them via correspondingly pre-defined support areas to the vehicle frame 4.

A further advantage of this solution is that because of the arrangement of the transverse support elements 16 to 18, simultaneously a sub-division of the box structure 3 into adjacently-disposed equipment boxes or compartments 27, 28 or a crew cab 29 is possible.

In this respect the individual components of this box structure 3, such as the horizontal support element 12, the transverse support elements 16 to 18 and the roof support panel 22 and the vertical separating elements 26, comprise sheet metal profiles or guiding or reinforcement areas 32 formed by correspondingly-bent over areas 30 or passages 31, or of planar sheet metal sections connected therewith having further sheet metal reinforced profiles 33.

Each of these equipment boxes or compartments 27, 28 formed between the individual transverse support elements 16 to 18 can be accessible via a single door arrangement 34, for example a roller shutter 35, the bearing and drive device 36 of which is concealed in an angled-off longitudinal area 37.

It is of course also possible to form each equipment box or compartment 27, 28 by means of a plurality of door arrangements 34 arranged next to one another in the region of one of the two side walls 38, 39 relative to the vehicle longitudinal axis 11 or in the direction of travel, arrow 10.

By means of these profiles connected in a torsion-resisting manner, or sheet metal profiles or planar sheet metal elements with their bent-over areas 30 or passages 31 or reinforcing ribs or the connection with corresponding profiles produced by folding procedures or the like, the latter not only take over the separation or distribution between a crew cab 29 or equipment box or compartments 27 and 28, but also the longitudinal, vertical and transverse reinforcement of the box structure 3, so that a tubular support framework or a framework structure can be omitted. Above all, the torsion-resistance is if necessary also advantageous in that the individual components, such as the transverse support elements 16 to 18, engage over or cover the horizontal support element 12 or the roof support panel 22 in penetrated or oppositely facing areas, whereby the torsion resistance is produced and the application of tensile loads or compressive forces, even with thin walls 40 of these components, can be transmitted over large areas by the distribution of the forces to be applied.

FIG. 2 to 5 show an embodiment variant of a utility vehicle 1, which in turn comprises a vehicle chassis 2 with two vehicle axles 6 and 7, which are supported on the support surface 19 by wheels 8, and a driver's cab 9 and a box structure 3.

The box structure 3 comprises a crew cab 29, and three equipment boxes or compartments 27 and 28 arranged one behind the other in the direction of the vehicle longitudinal axis 11. Each of said equipment boxes or compartments 27, 28 can be closed by means of roller shutters 35 in the region of the opposite side walls 38 and 39.

The crew cab 29 arranged behind the driver's cab 9 is connected by a transitional and sealing element 41 to the driver's cab 9 to form a uniform crew cab 29. The crew cab 29, in addition to the doors 42 in the driver's cab 9, is also accessible via additional doors 43 in the two side walls 38, 39. The equipment boxes or compartments 27, 28 and the crew cab 29 are separated from one another by the transverse support elements 16, 17 and 18.

The two transverse support elements 17 located in the region of the rear vehicle axle 7 are, in the longitudinal direction of the vehicle frame 4, at a spacing apart 44, which is preferably greater than a diameter 45 of the wheel 8 by a dimension required for the application of snow chains. This makes it possible for the equipment boxes or compartments 27 and 28 located on either side of the equipment box or compartment 28 above the rear vehicle axle 7 and adjacent thereto to extend from an upper edge 46 of the vehicle frame 4 by the length 20 of the arm 21 downwards into the so-called cavity 47, whereby a loading access facility can be obtained from a base surface 48 of the equipment box or compartment 28 continuously up to the roof support panel 22.

Thus for example a generator unit 49 for a hydraulic life-saving unit or a extinguishing substance pump or other pieces of equipment or extinguishing substance cans for additives can be mounted on a so-called pivoting compartment 50, which can be pivoted out about a pivotal axis 51 from the interior of the equipment box or compartment 28.

The door arrangement 34 is respectively formed by a roller shutter 35, and in the region of the equipment box or compartment 28, which is directly adjacent to the crew cab 29, and in the equipment box or compartment 27 by a roller shutter 35 and a pivot flap 52. Said pivot flap 52 can be pivoted out of its inoperative position, in a vertical position in which the roller shutter 35 abuts on the pivot flap 52 providing a sealed closure of the equipment box or compartment 27, 28, outwards into a swung-open position shown in thin continuous lines, in which position it forms a standing platform 53 for the operator or user of such a utility vehicle 1.

Thus, whereas loading access is possible from the cavity 47 up to the roof support panel 22 from the side of the vehicle frame 4, loading access is also possible above the vehicle frame 4 from a base 54 of the horizontal support element 12 up to the roof support panel 22.

By virtue of the fact that the entire actuating mechanism of the bearing and drive device 36 for the roller shutter 35 is housed in an assembly housing 55, and the roller shutter 35 forms a structural unit, the latter can easily be mounted in a recess 56 in a raised lateral area 57 on the longitudinal sides 58 of the roof support panel 22. By virtue of the fact that the roller shutter 35 is mounted in an assembly housing 55, the latter forms an inherently reinforced component which has a larger assembly surface so that, even when the roof support panel 22 is formed by a relatively thin-walled sheet metal part or plastic element, the said component can be connected with these latter over a large area, and thus additional reinforcing elements for securing the roller shutter 35 can be omitted.

As can be better seen from a combined view of FIG. 4 and 5, the roller shutters 35 are guided in guide tracks 59 which are secured in the region of end edges 60 of the transverse support elements 16 to 18, simultaneously forming the reinforcement of the terminal areas thereof, which are likewise usually formed by angled sheet metal panel sections made of aluminium or sheet steel.

Because of the fact that the cavities 47 can be closed by pivot flaps 52 which are pivotable about a bearing arrangement 61 extending parallel to the lower longitudinal side edges 62 of the sheet metal profiles 33, said longitudinal side edges 62 are also reinforced. The closer hinging pivot flaps 52 and their attachment and securement in the region of the sheet metal profiles 33 of the horizontal support element 12 is explained in more detail below. It is however essential that in this way roller shutters 35 of identical constructive height 63 can be used irrespective of whether cavities 47 are provided or not, so that in terms of a simple box system with a large number of identical parts, a solution can also be found in this area.

As best seen from the illustration in FIG. 4 and 5, a free space between the base 54 and the roof support panel 22 between the three transverse support elements 17 disposed one behind the other in the longitudinal direction of the box structure 3 is designed as a tank 64, whereby the two tank chambers 65, 66 as shown schematically in FIG. 4 can be connected by openings 67 with a common tank 64, or can be used for storing separated extinguishing substances, such for example as water and a foaming agent.

Side walls 68, 69 of the tank chambers 65, 66 are formed by vertical separating elements 26 inserted into the guiding or reinforcement areas 32, which are designed as groove-shaped recesses with a base surface 70 and side surfaces 71, 72. Said vertical separating elements 26 for example comprise U-shaped angled sheet metal panels, which rest upon one another with their edgewise webs 73 and are connected together in a sealing manner for example by an intermediate layer or an adhesive layer. The vertical separating elements 26 forming the tank chambers 66 are guided, depending on side and length, in the guiding or reinforcement areas 32 facing one another, or in the slots or groove-shaped receiving areas defined by the base surface 70 and the lateral surface, while the vertical separating elements 26 forming the tank chambers 65 abut on the facing outer sides 74 of the lateral surfaces 72 of the guiding or reinforcement areas 32, and are connected therewith.

The end-face partitioning of the tank chambers 65, 66 is effected by the transverse support elements 17.

Of course, it is also possible that the tank chambers 65, 66 can have a different heights 75. For this purpose one or more of the vertical separating elements 26 can be omitted in the direction of the roof support panel 22 and the tank chamber, for example as the tank chamber 65 shows, can be closed at the top by a horizontal separating element 76. This horizontal separating element 76 can simultaneously serve as a compartment base, so that for example, as shown schematically in FIG. 2, a loading base continuous from one side wall to the other side wall is created, on which pieces of equipment 77, for example a distributor 78, can be stored.

In this way it is possible, by fixing the arrangement of the horizontal separating elements 76, to provide tank chambers 65, 66 with variable load capacity, so that their volume can for example be adjusted simply to the storage of various extinguishing substances, such as for example water or a foaming agent.

Thus while for example the tank chamber 66 as is shown schematically in FIG. 2, can extend into the region of the roof support panel 22, the tank chamber 65 then extends over only a part of this height, i.e. up to height 75.

In accordance with the respective structural regulations and standards in various countries, it is for example also possible not only to arrange the tank chamber 66 between the vertical separating elements 26, but to design it in such a way that it extends over the entire width of the box structure 3, whereby the guide tracks 59 in the end edges 60 can be omitted and the vertical separating element 26 are arranged in the area of the end edges 60. For the increased reinforcement and stability of the box structure 3, the vertical separating elements 26 can certainly be retained, but in this case they would have to be provided, like the transverse support element 17 in FIG. 4 for example, with corresponding through openings 67 for the liquid.

FIG. 5 shows further that on a rear wall 79 of the driver's cab 9 a through opening 80 is provided, which at least in certain areas provides a covering opening 81 in the transverse support element 16, which is immediately adjacent to the driver's cab 9. The through opening 80 is surrounded on the outer surface facing the transverse support element 16 by a reinforcement frame 82, which is conventionally formed by tube sections or correspondingly-shaped profiles. By means of this reinforcement frame 82, the rear wall 79 is reinforced after production of the through opening 80 to such an extent that an arrangement of connector elements between the latter and the transverse support element 16 facing the driver's cab permits sufficient rigidity.

In order to align the relative position between the driver's cab 9 and the box structure 3 there is provided a guiding and damping device 83, formed by a guiding and damping element 84, for example a truncated cone-shaped component of elastomer plastic or a rubber composite part, arranged on the rear wall 79 of the driver's cab 9, to which there is provided a guiding and damping element 85 disposed on the transverse support element with a receiving opening 86 with a cross-sectional design diametrically opposed to the guiding or damping element 84. In the case of relative displacements between the driver's cab 9 and the box structure 3, by means of corresponding deformation and resilient compression of the guiding or damping elements 84 and 85 a centring and alignment of the two parts, and damping of the displacement movements of the driver's cab 9 mounted vibrationally damped independently of the box structure 3 by its own damping elements 87 on the vehicle frame, can be compensated and damped.

By means of the diametrically opposed conical or truncated cone-shaped design of the guiding or damping elements 84 or of the receiving opening 86 of the guiding or damping element 85, a three-dimensional alignment and damping of the spatial relative movements of the driver's cab 9 relative to the box structure 3 can be achieved, whereby due to the restoring force built up in a diametrically-opposed deformation thereof, the two parts, in the inoperative position, at least when the vehicle is stationary, are as far as possible moved back into the desired neutral position, so that a transitional and sealing element 41 covering the area of movement between the driver's cab 9 and the box structure 3 can adopt a permanent sealing position on the driver's cab 9 or on the box structure 3.

As FIGS. 6 to 9 show, when a three-dimensional displacement of the driver's cab 9 occurs relative to the box structure 3, for example out of the covering position shown in continuous lines into the relative position shown in dotted lines, the relative displacement leads to a deformation of the guiding or damping elements 84 and 85, for example by a distance 88. By means of the deformation of the guiding or damping elements 84, 85 relative to one another, above all due to the restoring force built up by the compression of the resilient material, the restoring force becomes greater as the distance 88 increases and thus the displacement movement is damped. Directly after termination of the forces acting from the outside, said resilient deformation leads to a restoring movement into the neutral position shown in continuous lines. In order to simplify understanding of how this operates, the displacement has been shown only in the lateral direction, and thus the distance 88 also only in the lateral direction. Of course, a relative rotation of the driver's cab 9 with respect to the box structure 3 usually involves a three-dimensional movement, and due to the all-round resilience of the guiding or damping elements 84 and 85, and the damping and of course also the restoring movement act in the direction of the neutral zero position shown in continuous lines.

As is further to be seen from these Figures, the transitional and sealing element 41 comprises a longitudinal profile 89, made of resilient material, which is provided with several groove-shaped passages 90 which are corrugated in cross section or parallel to one another. The result is a displaceable bellows in the manner of an accordion, which is preferably connected as one piece in the region of the two longitudinal lateral edges by securing lugs 91, 92, of which the securing lug 92 is provided with a support surface 93 for resting on the driver's cab 9. The cross-sectional shape of this securing lug 92 is approximately fitted to the contour of the driver's cab 9 in the contact area of the transitional and sealing element 41. On the other hand, the securing lug 91 encloses, between the longitudinal profile 89 and the securing lug 91, a receiving slot 94, which can be pushed on to a retaining part of the box structure 3, for example a surrounding sheet metal strip. Of course, it is equally possible to provide the longitudinal profile 89 with a surrounding weather strip cord along the longitudinal lateral edge, or with a correspondingly designed rubber fitting, which can be brought into engagement with a weatherstrip cord disposed on the transverse support element 16.

FIGS. 6 and 8 further show that there is disposed in the transitional and sealing element 41 a recess 95, through which access is possible to the underlying monitoring and supervising elements such for example as a water level indicator for the cold water or an oil dip stick and if necessary further power connections such as sockets or the like. Said recess 95 can be closed by a flap 96 visible in FIG. 6.

Furthermore, the transitional and sealing element 41 can be provided above the flap 96 with apertures in which there are disposed one or more monitor lamps 97. Thus for example, due to the number of monitor lamps 97 switched on, it is possible to indicate optically in a simple way the filling level of a tank for the operating personnel outside the utility vehicle 1. Of course, other operational conditions of the utility vehicle or of the built in units, for example emergency shut-down alarms and the like, can be incorporated.

By means of such a design, said transitional and sealing element 41 can at the same time take over technical functions.

The design of the transitional and sealing elements 41 as a longitudinal profile in the form of a corrugated strip permits a high degree of flexibility of the connecting area between the driver's cab and the box structure 3, as this strip can adapt to various three-dimensional relative positions by varying spatial expansions and deformations. By means of its design with a thin wall thickness, even in the case of extreme relative displacements between the driver's cab 9 and the box structure 3, the occurrence of high tensile loads in the area of the securing lugs 91 and 92 is reliably prevented, and a sealed closure between these two portions of the utility vehicle can be achieved even over a long operational period.

FIG. 10 shows a possible design of a transverse support element 16 or 17 or 18, which is provided for reinforcement in a direction perpendicular to the roof support panel 22 or to an end edge 98 facing the latter, with longitudinally-extending groove-shaped passages 99 or edges 100.

In order to achieve an attachment between the transverse support elements 16 and the roof support panel 22 which counteracts torsion or diagonal displacement of the individual parts of the box structure, a central web 101 can be connected in this area with an angled support surface 102. Said support surface 102 preferably projects in the direction opposite to the base surface 70 of the groove-shaped passages 99, which form the guiding or reinforcement areas 32. In order to permit a larger connecting surface between the transverse support element 16 and the roof support panel 22, it is also advantageous for example to dispose an additional support element 103, which for purposes of improved lateral guidance can be provided with extensions 104, which can be inserted into the groove-shaped passages 99 or into the angled part 100, and have a support surface 105 upon which the roof support panel 22 then rests, and can be connected thereto for example over a large surface by means of adhesive. Such an arrangement of support elements 103 can for example now only be effected in the case of the two transverse support elements 16 and 18 defining the two outer end walls of the box structure 3. It is however equally possible to insert the support elements 103 in the case of each of the transverse support elements 16 to 18.

By means of the arrangement of the extensions 104, in the case of a support element 103 additionally attached to the transverse support element 16, a high degree of lateral stability is provided, as the support elements 103 are guided in a positive locking manner via the extensions 104 in the groove-shaped passages 99.

FIG. 11 shows an embodiment variant for a central part or a core part 106 of the box structure 3. This core part 106 extends above the cross-sectional area defined by the longitudinal support 107 of the vehicle frame 4.

It can also be seen from this Figure that the horizontal support element 12 simultaneously takes over the function of a carrier for an auxiliary frame 108 comprising nodal reinforcing elements 109.

Resting on these nodal reinforcing elements 109 is the base 54 of the horizontal support element 12, which, correspondingly designed, can if necessary have a U-shaped cross-section, the arms projecting in the direction of the vehicle frame 4, as indicated by dotted lines.

Disposed on the horizontal support element 12 in this embodiment are vertical separating elements 26, formed from a one-piece angled sheet metal section. In order to achieve a high resistance to buckling of these vertical separating elements 26, there are attached on the surfaces facing one another reinforcing elements 110, for example longitudinal profiles of sheet metal, aluminium or the like with a C-shaped or hat-shaped cross-section, by an adhesive layer 111 or by means of a welding process, for example also by spot welding, onto the vertical separating element 26.

On inwardly angled webs 73 of the vertical separating elements 26 there is disposed a horizontal separating element 76, by means of which for example a tank 64 can be partitioned or subdivided in the direction of the roof support panel 22.

A free space between this horizontal separating element 76 and the roof support panel 22 can for example be used as an overflow chamber for the tank 64. A man-hole 112 for access to this overflow chamber can be disposed in the roof support panel 22, and from there if necessary a further man-hole cover into the tank 64.

In order further to reinforce the box structure 3 it is also possible to arrange the longitudinal side 58 of the roof support panel 22 by means of a longitudinal support element 24, for example a sheet metal profiled part 113 with a C- or L- or U-shaped cross-section or similar, as shown in the opposite longitudinal lateral areas of the roof support panel 22.

If for example a sheet metal profiled part 113 with an L-shaped cross-section is used, both arms of this profiled part 113 are superficially connected with the roof support panel 22 or with an arm projecting therefrom in the direction of the horizontal support element 12. If the profiled part 113 is designed with a U-shaped or C-shaped cross-section it is also possible to use these longitudinal support elements 24 as an assembly housing 55 for the bearing and drive device 36 of the roller shutters 35, by means of which the side walls 38, 39 of the box structure 3 are closed.

A further advantageous design and arrangement of vertical separating elements 26 is shown in FIG. 12. In particular when a vertical partitioning or separation of the box structure 3 is achieved by small-area vertical separating element 26, it is of advantage if the positioning and reinforcement of the same is effected by reinforcing elements 114, such as are for example formed by an L-shaped profile.

In the case of this L-shaped profile, the support panels 115 forming one arm are superficially supported on the vertical separating element 26, and connected therewith for example by an adhesive layer not shown, and have a recess 116 or notch, which engages over and accommodates the webs 73 of the vertical separating elements 26 projecting in the direction of the reinforcing element 114.

In order to provide even more effective reinforcement, it is also possible to dispose on one of the end sides of the reinforcing element 114 a further angled sheet metal part 117.

By means of this reinforcing element 114, the two vertical separating elements 26 are held one above the other in their flush position, and at the same time the buckling resistance of these small-area vertical separating elements 26 is reinforced.

An inwardly-projecting arm 118 of the reinforcing element 114, which is disposed for example at approximately 90° to the support panels 115, if the internal space defined by the vertical separating element 26 forms a tank, can simultaneously be used as a so-called surge plate. 15 In the embodiment shown, the vertical separating elements 26 rest on the horizontal support element 12 and are guided laterally and in longitudinal direction by the guiding or reinforcing elements 32, for example the passage 99 or the transverse support element 17.

FIG. 13 shows in detail a possible embodiment variant of the horizontal support element 12. In this case the horizontal support element 12 consists in cross-section of a plurality of individual parts 119, 120 extending parallel to one another and connected to one another.

As can further be seen from this Figure, there is disposed between the individual parts 119, 120 extending parallel to one another in the longitudinal direction of the box structure 3, a nodal reinforcing element 121, which is formed in the present case by a longitudinal profile 122 with a hollow profiled cross-section. Said profile is disposed in the area of one end edge 123 between the individual part 119 forming the base 54 of the horizontal support element 12, and the individual part 120 of the horizontal support element 12 forming one arm 21. As is further visible, the mutually directly adjacent end edges 124, 125 of the horizontal support element 12 are disposed in the area of a lateral wall 126, so that the area of abutment between the two individual parts 119, 120 is covered by the longitudinal profile 122. In order to reinforce the entire construction it is then also advantageous if the nodal reinforcing elements 121 are connected by transverse carriers 127 extending transversely to their longitudinal direction, as a nodal reinforcing element 121 is arranged in the area of each of the two end edges 123 of the horizontal support element 12. A high degree of strength of the horizontal support element 12 is achieved if the nodal reinforcing elements are made of steel and the transverse carriers 127 are also of steel.

The connection between the individual parts 119, 120 and the nodal reinforcing element 121 can be provided by an adhesive layer 128. It is naturally also possible to weld these parts and the nodal reinforcing element 121 together or to provide mechanical connecting elements such as rivets, screws or the like between these elements.

FIG. 14 shows a further embodiment variant of the horizontal support element 12.

In this case the horizontal support element 12 comprises a plurality of components 129, 130 disposed one behind the other in the longitudinal direction of the end edge 123. These are formed to overlap one another in their terminal areas, and are connected together either by an adhesive layer 128 or by securing means 131. Thus even in the case of long box structures 3, it is possible in a simple way to find a solution with components 129, 130 of identical shape, while in the case of longer box structures 3 a plurality of such components 129, 130 are disposed longitudinally one behind the other, and fewer in the case of shorter box structures 3.

Basically, a solution can be found with two components 129, 130, as between two components 129 disposed one behind the other in the longitudinal direction and at a spacing apart, there is provided a component 130, which is greater than the component 129 by the wall thickness, and thus fits over the components 129 in the overlapped area. Naturally it would also be possible, by corresponding offsetting of the terminal areas of one of the two components 129, 130, to provide the double wall thickness only in the overlap area, i.e. designing the ends in a roughly bush-shaped form.

Whereas in the embodiment according to FIG. 13 described above the end edges 124, 125 of the two individual parts 119, 120 overlap in the region of the lateral wall 126 of the nodal reinforcing element 121, it is of course also possible for the base 54 to be formed by a planar sheet metal panel, which represents the individual part 119. The individual part 120 then connects in the area of the end edge 123.

There is further shown, in FIG. 14, a special type of a nodal reinforcing element 121. This comprises two longitudinal webs 133, 134, spaced apart depending on height and connected parallel to one another by a transverse web 132. One of the longitudinal webs, i.e. longitudinal web 133, is of lesser width 135 than the longitudinal web 134. Connecting with each longitudinal web 134 which has a greater width, there is a lateral web 136 facing away from the transverse web 132, and which is provided with a lateral strip 137 projecting at an angle thereto, but parallel to the longitudinal web 133 having the lesser width 135.

Over a part of the length of the nodal reinforcing element 121, support portions 138 are notched out of the lateral web 136 and the lateral strip 137, and inclined inwards in the direction of the transverse web 132 at an angle, so that a lateral strip part 139 originally forming the lateral strip 137 abuts over its width on an underside of the shorter longitudinal web 133 facing the longitudinal web 134. Both the longitudinal web 133 and the longitudinal web 134 can be penetrated by bores 140 aligned perpendicularly to their surface, so that the securing means for securing the horizontal support element 12 on the vehicle frame 4 can be passed through these bores 140.

FIG. 15 shows an embodiment of the transverse support element 17. This transverse support element 17 is likewise formed with guiding or reinforcement areas 32 in the form of passages 90. In order to connect the transverse support element 17 with a horizontal support element 12 not shown or with the roof support panel 22, individual areas, or the entire width extending transversely to the longitudinal direction of the vehicle, can be provided with support elements 141, or support profiles 142, or extensions 143.

Said support elements 141 are for example formed by angular angled areas in the end areas of the transverse support element 17, or by support profiles 142, for example L profiles, which are attached in the end area of the transverse support element 17, for example in the area of the guiding or reinforcement regions 32. The extensions 143 also, which can for example face the roof support panel 22, can be formed by angled areas of the transverse support elements 17. These support elements 141 or support profiles 142 advantageously achieve a situation in which the transverse support element 17 has inherent stability, so that attachment work and the application of thrust, tensile and bending stresses is improved. The same applies to the attachment of the roof support panel 22 via the extensions 143. In this way it is also unnecessary for the support elements 141 and the support profiles 142 or extensions 143 to extend continuously over the entire width of the transverse support elements 16 to 18; it is sufficient if these are provided in individual areas, in order to permit application of force and attachment. In order to provide additional reinforcement for the transverse support elements 17, it is further however also possible to provide, parallel to the horizontal support element 12 or to a support surface facing this, reinforcing elements 144. These for example, like the reinforcing elements 110 of the vertical separating elements 26, can be formed by profiles, sheet metal parts or other components of different shapes. In the embodiments shown, the reinforcing element 144 is formed by a U-profile.

It is however also equally possible to dispose the reinforcing element 144 by means of beads 145 in the sheet metal parts forming the transverse support elements 16 to 18. Thus the resistance to buckling of the planar transverse support elements 16 to 18 is further increased.

In particular, the reinforcing elements 144, the U-profiles or other aluminium profiles can simultaneously form the receiving means for pieces of equipment or compartment floors or the like.

Moreover, the transverse support elements 16 to 18 can be formed by a planar multiple-angled sheet metal section, in which also the extensions 143 or the support elements 141 can be formed in one-piece.

FIG. 16 to 17 show a vertical separating element 26, extending over a greater height.

In order to achieve sufficient resistance to buckling of this vertical separating element 26, which is substantially U-shaped and provided in its end area with angled webs 73, there are provided in the area between the webs 73 reinforcing elements 110, which can be connected to the vertical separating element 26 by means of an adhesive layer 128 or securing means 123, e.g. rivets.

Of course, other any other type of attachment of the reinforcing elements 110 on the vertical separating element 26 can be used, for example spot welding or tack welding.

Two transverse support elements 17 and 18 are shown in FIG. 18.

The transverse support element 18 forms the rear wall of the box structure 3 and is provided in the area of a central web 101 with an aperture.

Said aperture is selected so that a panelling element 146 and a tail gate 147, which can for example be attached by a horizontal hinge arrangement 148 to the panelling element 146, can be integrated in a planar manner in lateral portions 149 of the transverse support element 18.

In order to achieve a passage through the transverse support element 18 in the region of the tail gate 147, the latter is provided with an aperture 150 in the region of the central web 101. Due to the varying design of these transverse support elements 18, it is thus possible in a simple way to render the aperture 150 accessible via a tail gate 147 or pivoting door, roller shutter or the like and despite this to obtain a hinged closure of the vehicle structure. If access to the box structure 3 from the rear, i.e. from the sides of the rear wall, is not necessary, at this point a fully solid sheet metal element can be inserted, so that a planar design of the rear wall in various designs of vehicle can be achieved.

It can further be seen in the explosive view that in the guiding or reinforcement area 32 vertical separating elements 26, formed by angled planar sheet metal sections, which can be made from sheet steel, aluminium or for example from GRP moulded parts can be inserted.

If however the vertical separating element 26 is necessary for separating a tank chamber 65 from the other areas of the box structure 3, for this purpose for example a sandwich element 151 can also be inserted, which is comprised of two cover layers 152, 153 and a core 154. While the cover layers 152, 153 can be made from very different materials, such for example as metal or plastics, for example GRP, aluminium, sheet steel or stainless sheet, the core is conventionally formed by a plastic or plastic foam or a honeycomb, in particular an aluminium honeycomb. Depending on the material used, in this way various degrees of buckling resistance and strength of the sandwich element 151 can be achieved. In addition, these sandwich elements 151 also have the added advantage that, for example when the tank 64 is being defined with respect to the rest of the structure by insulation of the tank chamber 65, when the units are used at low temperatures in the open air the formation of ice in the tank chamber 65 can be delayed and in addition formation of condensation on the walls of the tank chamber 65 can be advantageously reduced.

FIGS. 19 to 21 show that the box structure 3 in addition to the main elements comprising the horizontal support element 12, the transverse support elements 16 to 18 and the roof support panel 22 and also if necessary the vertical separating element 26, can also be provided with components 155, 156 and 157. In addition to components produced in an approximately similar manner according to a uniform construction principle, these components 155 to 157 are already designed so that they fulfill a defined purpose or are designed to receive predetermined devices.

Thus for example the components 155 to 157 can form a component 130 of the horizontal support element 12. This for example has the advantage that the nodal reinforcing elements 121 can be omitted in a part of the horizontal support element 12, and thus in this area of the box structure, a larger internal height is provided. In this way a better utilisable height and simpler incorporation, for example of a pump unit, can be achieved. By using the further components 156 and 157, the component 130 can be constructed at a strength corresponding to the configuration at any time of the rest of the horizontal support element 12. For this purpose there is provided a component 155, extending the base 54 of the horizontal support element 12, and which can be provided with a vertical off-set, which corresponds approximately to the constructive height of the nodal reinforcing element 121. This component can be provided in one end wall 158 with a corresponding aperture 159 allowing passage to a drive shaft from the auxiliary drive of the vehicle to a fire extinguishing pump or a generator unit or the like. The component 155 is provided with support elements 141 in the area of the horizontal support element 12 facing the base 54 or the arms 21, so that a rigid connection is permitted with the other components of the horizontal support element 12. The arms 21 of the horizontal support element 12 are in this case formed by side walls 160 of the component 157, which form a cavity 47 in the area connecting contrary to the direction of travel with the rear vehicle axle 7. This component 157 can appropriately also be provided with end walls 161, which form the vertical portions of the transverse support element 18 between the level of the base 54 and a base plate 162, or which can be formed as an overlapping connecting element with the transverse support elements 17 and 18.

The component 156 can then serve as an intermediate element reinforcement the transverse support elements 17 and 18, and be substantially L- or Z-shaped, being inserted between the two components 155 and 157 in order to permit vertical reinforcement of the transverse support elements 17 and 18. In this way a receiving space 163 for the fire extinguisher pump can be co-ordinated with the respective dimensions and if necessary be provided with corresponding receiving bores 164 for mounting the fire extinguishing pump, and for this purpose for example can be provided in these areas, if this component 155 consists of GRP, of reinforcing elements 165 machined therein or otherwise, if the latter is formed from a planar sheet metal section, welded or glued thereto, in order to permit a secure mounting for the fire extinguisher pump or other units or heavy items of equipment.

The use of the components 155 to 157 shown in FIG. 19 to 21, thus allows a large degree of freedom in the manufacture of self-supporting box structures, and it is naturally possible to insert these components not only between the transverse support elements 17 and 18, but also between any other transverse support elements 16 to 18. In order to provide a correspondingly torsion-resistant connection, for example between the components 155 to 157, the latter can be provided with correspondingly large-area securing flanges 166, which have a plurality of bores 167 for receiving securing means. In a similar way, the components 156, 157 can be formed by notched and multiple-angled support elements 141, as FIG. 20 shows, the bores 167 of which are arranged with correspondingly diametrically opposed and coincident bores 167 in the side wall 160 of the component 157, as FIG. 21 shows.

Finally it should be noted that of course the concept of such a self-supporting box structure 3 for utility vehicles 1 can be varied in many ways.

Thus it is possible among other things, as FIG. 18 shows, to provide an aperture 168 in a transverse support element 17. This can be produced in such a way that a wall part 169 is notched and angled for example through 90° to the transverse support element 17. A nodal reinforcing element 121 can project through this aperture 168 and can for example be connected to the wall part 169, so that exact positioning and high stress-absorbing capacity of the transverse support element and the corresponding reinforcement of the box structure 3 can be achieved. Of course, said aperture can also have a reinforcing element 110 or 114 projecting therethrough. Particularly when the reinforcing elements 110 and 114 penetrate through the transverse support element 16 to 18, a direct positive locking connection via these reinforcing elements 110 and 144 between the vertical separating elements 26 disposed on either side of a transverse support element 17 is possible. In this way the angular rigidity and torsional rigidity of the box structure 3 is additionally increased. Furthermore, it is for example possible, in order to increase the security of securing means 131, for example in the region of the transverse support elements 16 to 18 or also of the vertical separating elements 26, to incorporate in the guiding or reinforcement areas 32 reinforcing elements 170 as indicated by dotted lines in FIG. 18. These reinforcing elements 170 can be formed by corresponding profiled parts or angled sheet metal parts, which can be attached by an adhesive layer or by weld connections or tack welding to the respective component, particularly in the transverse support elements 16 to 18 and the vertical separating elements 26.

Shown in FIG. 22 and 23 is a part of the box structure 3 in the region of a side wall 38, in which the transverse support element 17 extends downwards so far beyond the vehicle frame 4 that a cavity 47 is formed.

In order to attach heavy pieces of equipment, also in particular in order to attach a pivot bearing 171 with a pivotal axis 51 for a pivotal compartment 50, for example a generator unit 49, shown in the pivoted-out position in FIG. 22, it is also possible to arrange, on the transverse support element 17 and/or in the corner area between the transverse support element 17 and the vertical separating element 26, a support profile 172 which, as is for example better visible from FIG. 23, can be in the form of a drawn aluminium profile with undercut securing grooves 173.

By means of sliding blocks 174 inserted into these undercut securing grooves 173, the support profile 172 can be attached both to the transverse support element 17 and also, if required, to the vertical separating element 26. These sliding blocks 174 are usually provided with threaded projections projecting out of the support profile 172, so that it can be attached by nuts turned on to the thread at any time in the interior of the box structure 3.

A support framework 175 or pivotal mounting 171 with pivotal axis 51 can also be attached via the sliding blocks 174. In this way it is possible to pivot the generator unit 49 by means of pivotal compartment 50 into the position shown in dotted lines, and thus to permit better access thereto.

It is however equally possible to mount and secure compartment floors or other securing frames for pieces of equipment and units in the box structure by means of such support profiles 172.

By means of the special design of the box structure 3 described above, it is now however also possible, as FIG. 2 shows, to attach the driver's cab 9 and the box structure 3 via separate securing devices 176, 177 to the vehicle frame 4. Thus the driver's cab 9 is attached on the vehicle frame 4 via the securing devices 176, for example rubber-metal mounts or another damping system, while independently thereof the box structure 3 is connected to the vehicle frame 4 by securing devices 177. The three-dimensional displacements between the driver's cab and the box structure resulting from the different attachments and their different damping and vibratory characteristics are, as already explained with reference to FIG. 6 to 9, compensated by the transitional and sealing element 41, and a sealed connected between the driver's cab and the box structure 3 is produced.

By means of the design of the cavities 47 it is possible in a simple way, as shown for example in the diagram in FIG. 6, to dispose the boarding ladder 178 of reasons of easier access to the crew cab 29 mounted in the box structure 3 in this cavity 47, the boarding ladder 178 then being located within the door 43.

This has the advantage that even in difficult operating conditions, in particular in winter with snow and ice, the boarding ladder 178 is protected, and icing is prevented. Thus safe access to this boarding ladder 178, particularly for those personnel equipped with heavy apparatus such as breathing apparatus, is possible without risk. In addition, corresponding illumination can be incorporated in the interior space.

As finally shown in FIG. 4, it is possible to dispose in the region of the aperture 56 in the lateral area 57 of the box structure 3, for example above a bearing and drive device 36 for the roller shutters 35, a light source, for example fluorescent tube 179, so that apron illumination or external illumination around the utility vehicle 1 or the box structure 3 can be ensured by the fact that a transparent disc 180 made for example of Plexiglas, is disposed on the side wall 39. In a similar way it is also possible to illuminate the area located at the roof support panel 22 between the two lateral areas 57 in such a way that corresponding slots 181 can be provided which are for example likewise covered with glass or Plexiglas, so that a part of the light from the florescent tube 179 also illuminates the roof area of the box structure 3.

In this way access to the pieces of equipment can be improved and the risk of accident to the personnel in the region of the utility vehicle 1 can be considerably reduced.

Finally it should be noted that for purpose of better understanding of the invention, the individual portions and components have been shown out of proportion and distorted out of scale.

Each one of the embodiments shown can represent an independent inventive solution, or also individual groups of features of individual embodiments and individual features or groups of features of various embodiments can form in combination with one another independent solutions according to the invention.

| List of Reference Numbers | |
|---|---|
| 1 utility vehicle | 41 transitional and sealing element |
| 2 vehicle chassis | 42 door |
| 3 box structure | 43 door |
| 4 vehicle frame | 44 spacing |
| 5 spring element | 45 diameter |
| 6 vehicle axle | 46 upper edge |
| 7 vehicle axle | 47 cavity |
| 8 wheel | 48 base surface |
| 9 driver's cab | 49 generator unit |
| 10 arrow | 50 pivotal compartment |
| 11 vehicle longitudinal axis | 51 pivot axis |
| 12 horizontal support element | 52 pivot flap |
| 13 spacing | 53 standing platform |
| 14 spacing | 54 base |
| 15 spacing | 55 assembly housing |
| 16 transverse support element | 56 recess |
| 17 transverse support element | 57 lateral area |
| 18 transverse support element | 58 longitudinal side |
| 19 support surface | 59 guide track |
| 20 length | 60 end edge |
| 21 arm | 61 bearing arrangement |
| 22 roof support panel | 62 longitudinal lateral edge |
| 23 constructive length | 63 construction height |
| 24 longitudinal support element | 64 tank |
| 25 diagonal support element | 65 tank chamber |
| 26 vertical separating element | 66 tank chamber |
| 27 equipment box or compartment | 67 passage opening |
| 28 equipment box or compartment | 68 side wall |
| 29 crew cab | 69 side wall |
| 30 area | 70 base surface |
| 31 passage | 71 side surface |
| 32 guiding or reinforcement area | 72 side surface |
| 33 sheet metal profile | 73 web |
| 34 door arrangement | 74 outer side |
| 35 roller shutter | 75 height |
| 36 bearing and drive device | 76 horizontal separating element |
| 37 longitudinal area | 77 piece of equipment |
| 38 side wall | 78 distributor |
| 39 side wall | 79 rear wall |
| 40 wall thickness | 80 through opening |
| 81 opening | 121 nodal reinforcing element |
| 82 reinforcing frame | 122 longitudinal profile |
| 83 guiding and damping device | 123 end edge |
| 84 guiding or damping element | 124 end edge |
| 85 guiding or damping element | 125 end edge |
| 86 receiving opening | 126 side wall |
| 87 damping element | 127 transverse carrier |
| 88 distance | 128 adhesive layer |
| 89 longitudinal profile | 129 component |
| 90 passage | 130 component |
| 91 securing lug | 131 securing means |
| 92 securing lug | 132 transverse web |
| 93 support surface | 133 longitudinal web |
| 94 receiving slot | 134 longitudinal web |
| 95 recess | 135 width |
| 96 flap | 136 lateral web |
| 97 monitor lamp | 137 lateral strip |
| 98 end edge | 138 support part |
| 99 passage | 139 edge strip part |
| 100 angle | 140 bore |
| 101 central web | 141 support element |
| 102 support surface | 142 support profile |
| 103 support element | 143 extension |

List of Reference Numbers

| | |
|---|---|
| 104 extension | 144 reinforcing element |
| 105 support surface | 145 bead |
| 106 core part | 146 panelling element |
| 107 longitudinal carrier | 147 tail gate |
| 108 auxiliary frame | 148 hinge arrangement |
| 109 nodal reinforcing element | 149 lateral part |
| 110 reinforcing element | 150 aperture |
| 111 adhesive layer | 151 sandwich element |
| 112 manhole | 152 covering layer |
| 113 profiled sheet metal part | 153 covering layer |
| 114 reinforcing element | 154 core |
| 115 support plate | 155 shaped component |
| 116 recess | 156 shaped component |
| 117 sheet metal part | 157 shaped component |
| 118 arm | 158 end wall |
| 119 individual part | 158 recess |
| 120 individual part | 160 side wall |
| 161 end wall | |
| 162 base plate | |
| 163 receiving space | |
| 164 receiving bore | |
| 165 reinforcing element | |
| 166 securing flange | |
| 167 bore | |
| 168 aperture | |
| 169 wall part | |
| 170 reinforcing element | |
| 171 pivotal bearing | |
| 172 support profile | |
| 173 securing groove | |
| 174 sliding block | |
| 175 support framework | |
| 176 securing device | |
| 177 securing device | |
| 178 boarding ladder | |
| 179 fluorescent tube | |
| 180 disc | |
| 181 slot | |

We claim:

1. Self-supporting box structure for utility vehicles, particularly firefighting vehicles, for accommodating life-saving and/or extinguishing devices and if necessary extinguishing substances and/or pumps for extinguishing substances in a plurality of equipment boxes or compartments accessible from the outside via various door arrangements, characterized in that the self-supporting box structure (3) has a horizontal support element (12), which is designed in a plane perpendicular to a vehicle longitudinal axis (11) with a substantially U- or hat-shaped profiled cross-section, and on which are arranged in the direction of the vehicle longitudinal axis (11) at a spacing (13 to 15) from one another and perpendicular thereto at least three transverse support elements (16 to 18), which from a base (54) of the horizontal support element (12) project in the direction of a support surface (19) by a length (20) over the base (54) of the horizontal support element (12).

2. Self-supporting box structure according to claim 1, characterized in that the component (129, 130) is designed as a single-layer sheet metal element of steel or aluminium.

3. Self-supporting box structure according to claim 1, characterized in that the component (129, 130) is formed by a sandwich element (151) with two cover layers (152, 153) and a core (154) made of plastic or plastic foam or a honeycomb structure, in particular an aluminium honeycomb.

4. Self-supporting box structure according to claim 1, characterized in that the transverse support elements (16 to 18) are connected to a longitudinal support element (24) extending over the constructive length (23), for example of the horizontal support element (12) and/or of the roof support panel (22) or a further transverse support element (17) by means of a diagonal support element (25) formed by at least one profiled sheet metal part.

5. Self-supporting box structure according to claim 1, characterized in that an end-side transverse support element (16) of the box structure (3) is arranged in the immediate vicinity of a rear wall of the driver's cab (9) and extending parallel thereto.

6. Self-supporting box structure according to claim 1, characterized in that a cross-sectional shape of the box structure (3) in the region of an end transverse support element (16) is adapted to a cross-sectional shape of the driver's cab (9) aligned perpendicularly to the vehicle longitudinal axis (11), and in that there is arranged between the driver's cab (9) and the box structure (3) in the region of the side walls (38, 39) and of the roof support panel (22) and/or the transverse support element directly adjacent thereto a surrounding resilient connecting element.

7. Self-supporting box structure according to claim 1, characterized in that the transverse support elements (16 to 18) are provided in their end areas facing the horizontal support element (12) and/or the roof support panel (22), with support elements (141) or support profiles (142) extending at an angle thereto.

8. Self-supporting box structure according to claim 1, characterized in that at least one transverse support element (17) is provided with an aperture (168) in particular with a notch, the wall part (169) of which is bent over at an angle of approximately 90° to the transverse support element (17) and a nodal reinforcing element (121), and a reinforcing element (110, 144) penetrates through the aperture (168) and is connected with the vertical separating element (26) on either side of at least one transverse support element (17) in a non-positive or positive-locking manner.

9. Self-supporting box structure according to claim 1, characterized in that the transverse support element (16 to 18) is provided with a reinforcing element (110, 144) extending parallel to a support surface associated with the horizontal support element (12).

10. Self-supporting box structure according to claim 1, characterized in that the reinforcing elements (110, 144) are formed in particular by sheet metal parts or profiles which are angled in the manner of a longitudinal profile.

11. Self-supporting box structure according to claim 1, characterized in that the reinforcing elements (110, 144) are formed by passages or beads (145).

12. Self-supporting box structure according to claim 1, characterized in that on either side of the rear vehicle axle (7) or rear axles, there is disposed respectively a transverse support element (17) and, in the direction of the driver's cab (9), at least two further transverse support elements (16, 17) and in the direction facing away from the driver's cab (9) at least one further transverse support element (18) respectively at a spacing (13 to 15) from one another.

13. Self-supporting box structure according to claim 1, characterized in that the rear-side transverse support element (18) has a receiving area, e.g. a central web (101) for a tail gate (147), which is offset in the direction of travel perpendicularly to the transverse support element (18), and is provided with an aperture (150).

14. Self-supporting box structure according to claim 1, characterized in that the guide tracks (59) for the end edges of roller shutters (35) spaced in the longitudinal direction of the vehicle, are mounted on transverse support elements (16 to 18) on the side surfaces facing one another, and in the direct vicinity of one another.

15. Self-supporting box structure according to claim 1, characterized in that the transverse support elements (16 to 18) are provided with vertical, grooved guiding or reinforcement areas (32) with preferably U-shaped cross-section, perpendicular to the base (54) or parallel to the arms (21) of the horizontal support element (12).

16. Self-supporting box structure according to claim 1, characterized in that the groove-shaped guiding or reinforcement areas (32) of the transverse support elements (16 to 18) of two transverse support elements (16 to 18) directly adjacent to one another in the direction of the vehicle longitudinal axis (11) are aligned with their side surfaces (71, 72) projecting from the base surface (70) or with their base surface (70) projecting over the transverse support elements (16 to 18) towards one another.

17. Self-supporting box structure according to claim 1, characterized in that the transverse support element (16 to 18) is formed by a multiple-angle planar sheet metal section, and at least in partial areas, for example between the guiding or reinforcement areas (32), support elements (141) or extensions (143) extending at an angle thereto, are integrally formed.

18. Self-supporting box structure according to claim 1, characterized in that the extensions (143) disposed in the region of the guiding or reinforcement areas (32) are integrally formed as single pieces on the base surface (70) and are angled or bent over in the direction opposite to the side surfaces (71, 72).

19. Self-supporting box structure according to claim 1, characterized in that a panel- or profile-shaped vertical separating element (26) is arranged between two transverse support elements (16 to 18) and is connected thereto.

20. Self-supporting box structure according to claim 1, characterized in that a vertical separating element (26) engages in the groove-shaped guiding or reinforcement areas (32) with its end faces, and is guided or secured therein in a direction perpendicular to the vehicle longitudinal axis (11) by the side surfaces (71, 72) and in the longitudinal direction by the base surface (70) thereof.

21. Self-supporting box structure according to claim 1, characterized in that the vertical separating element (26) extend between two transverse support elements (16 to 18) over only a part of the height of the transverse support elements (16 to 18) extending approximately vertically to a base (54) forming a base plate.

22. Self-supporting box structure according to claim 1, characterized in that the vertical separating element (26) is formed by a planar or U- or C-shaped sheet metal part or sandwich element (151).

23. Self-supporting box structure according to claim 1, characterized in that the vertical separating element (26) is connected to reinforcing elements (110) for example profiles with a U-, C-, or hat-shaped profiled cross-section.

24. Self-supporting box structure according to claim 1, characterized in that the reinforcing elements (144) are formed by preferably elongate passages, preferably beads (145) with e.g. a U-, or V- or trapezoidal cross-section.

25. Self-supporting box structure according to claim 1, characterized in that the reinforcing elements (114) of the vertical separating element (26) are aligned in a direction extending approximately vertically to the transverse support elements (16 to 18).

26. Self-supporting box structure according to claim 1, characterised in that vertical separating elements (26), disposed one above the other in a direction extending perpendicular to the horizontal support element (12), are connected via a reinforcing element (114) aligned perpendicular to their surface.

27. Self-supporting box structure according to claim 1, characterized in that the reinforcing element (114) has an L-shaped cross-section and an arm of the reinforcing element (114), e.g. its support plate (115) is superficially connected with a respective surface of the vertical separating elements (26) adjacent to one another, in particular by an adhesive layer (128).

28. Self-supporting box structure according to claim 1, characterised in that there is disposed between the two support plates (115) connected to the vertical separating elements (26) an aperture (116) for the upwardly-angled lateral areas or webs (73) thereof.

29. Self-supporting box structure according to claim 1, characterised in that the horizontal support element (12) is formed in cross-section from a plurality of individual parts (119, 120) extending parallel to one another and connected together.

30. Self-supporting box structure according to claim 1, characterised in that between the individual parts (119–120) extending parallel to one another in the longitudinal direction of the box structure (3), or in the region of the end edges (123) between the base (54) and the arms (21) of the horizontal support element (12) there is arranged a nodal reinforcing element (121), for example a longitudinal profile (122) with a U-, C- or hollow profile-shaped cross-section.

31. Self-supporting box structure according to claim 1, characterised in that the nodal reinforcing element (121) is formed by a longitudinal profile (122), formed in the area of the two end edges (123) between the base (54) and the arm (21) of the horizontal support element (12), e.g. a hollow profile, and in that the longitudinal profiles (122) are connected in a non-positive and/or positive fashion in the longitudinal direction with transverse carriers (127) extending transversely to their longitudinal direction and spaced apart, and in that the longitudinal profiles (122) are preferably made of steel.

32. Self-supporting box structure according to claim 1, characterised in that the nodal reinforcing element (121) has two longitudinal webs (133, 134) spaced from one another and parallel to one another via a transverse web according to height, and one of the longitudinal webs (133) is of lesser width (135) than the other longitudinal web (134) and connecting with the longitudinal web (134) having the greater width on the side facing away from the transverse web (132) is a lateral web (136) which is provided with a lateral strip (137) projecting at an angle thereto yet parallel to the longitudinal web (133) having the lesser width (135).

33. Self-supporting box structure according to claim 1, characterised in that a support part (138) is notched out of the lateral web (136) and the lateral strip (137) over a part of the length of the nodal reinforcing element (121), and is inwardly inclined in the direction of the transverse web (132) at an angle, so that a lateral strip part (139) abuts over its width on an underside of the shorter longitudinal web (133).

34. Self-supporting box structure according to claim 1, characterised in that the lateral strip part (139) and the longitudinal web (133) with the smaller width (135) and the longitudinal web (134) are traversed by a bore (140) aligned perpendicular to their surface.

35. Self-supporting box structure according to claim 1, characterised in that the horizontal support element (12) and/or the roof support panel (22) and/or the transverse support elements (16 to 18) and/or the vertical separating elements (26) are connected together by adhesive layers (128).

36. Self-supporting box structure according to claim 1, characterised in that the horizontal support element (12) and/or the roof support panel (22) and/or the transverse support elements (16 to 18) and/or the vertical separating elements (26) are connected together by mechanical securing means (131), e.g. rivets or clamp screw connections.

37. Self-supporting box structure according to claim 1, characterised in that a horizontal separating element (76) is disposed between the edgewise lateral areas or webs (73) of two vertical separating elements (26) immediately adjacent to one another.

38. Self-supporting box structure according to claims 1, characterised in that horizontal separating elements (76) are supported or guided between two transverse support elements (16 to 18) immediately adjacent to one another in or on the reinforcing elements (110, 144).

39. Self-supporting box structure according to claim 1, characterised in that horizontal separating elements (76) which extend on either side of a transverse support element (16 to 18) in the direction of the further two transverse support elements (16 to 18), spaced apart therefrom are arranged at a varying distance from the horizontal support element (12).

40. Self-supporting box structure according to claim 1, characterised in that the horizontal separating element (76) is a partition wall between an inner space of a tank chamber (65) and preferably a surface of the horizontal separating element (76) facing away from the inner space of the tank chamber (65), in the form of a compartment floor.

41. Self-supporting box structure according to claim 1, characterised in that the horizontal separating elements (76) are provided with reinforcing elements (110, 144).

42. Self-supporting box structure according to claim 1, characterised in that the horizontal separating elements (76) form compartment floors for pieces of equipment (77) or extinguishing substance.

43. Self-supporting box structure according to claim 1, characterised in that, on the side of the transverse support elements (16 to 18) facing away from the horizontal support element (12) and parallel to said transverse support elements, there is arranged a preferably self-supporting roof support panel (22).

44. Self-supporting box structure according to claim 1, characterised in that the longitudinal support element (24) is formed by a profiled sheet metal part (113) e.g. by a longitudinal, particularly longitudinal hollow profile, disposed in the longitudinal lateral area of the roof support panel (22).

45. Self-supporting box structure according to claim 1, characterised in that the driver's cab (9) and the box structure (3) are connected to the vehicle frame (4) by mutually independent securing devices (176, 177).

46. Self-supporting box structure according to claim 1, characterised in that, between the driver's cab (9), particularly its rear wall (79), and the box structure (3), particularly its end-face transverse support element (16) associated with the rear wall (79) of the drivers cabin (9), there are disposed a resiliently or elastoplastically deformable guiding and damping device (83) e.g. delimiting stops e.g. with a strongly progressive characteristic curve.

47. Self-supporting box structure according to claim 1, characterised in that the surrounding resilient transitional and sealing element (41) is formed by a three-dimensionally deformable sleeve, e.g. a longitudinal profile (89).

48. Self-supporting box structure according to claim 1, characterised in that the transitional and sealing element (41) is formed by a longitudinal profile (89) of resilient material, covering at least the roof support panel (22) and if necessary the side walls (38, 39) of a box structure (3), and securing lugs (91, 92), e.g. lateral strips, extending in the region of the longitudinal lateral edges, and defining a receiving slot (94), said strips serving to fix and retain the transitional and sealing element (41) on the driver's cab (9) and/or the transverse support elements (16) immediately adjacent thereto.

49. Self-supporting box structure according to claim 1, characterised in that, between the driver's cab (9) and the box structure (3) particularly the transverse support element (16) immediately adjacent to the driver's cab (9), there is arranged a three-dimensional guiding and damping device (83) which is displaceable both in a direction perpendicular to the transverse support element (16) and also in a plane parallel to the transverse support element (16) against the restoring force of a spring element.

50. Self-supporting box structure according to claim 1, characterised in that the guiding and damping device (83) comprises at least one guiding or damping element (84, 85) movably connected to the driver's cab (9), and one such movably connected to the box structure (3), one outer guiding or damping element (85) having a receiving opening (86) for the other inner guiding or damping element (84) and a cross-sectional shape of the inner guiding or damping element (84) being adapted to a cross-sectional shape of the receiving opening (86) of the outer guiding or damping element (85), and at least one of the two guiding or damping elements (84, 85) being formed from a resiliently deformable and restoring material, for example plastic or rubber or the like.

51. Self-supporting box structure according to claim 1, characterised in that the receiving opening (86) is formed in the guiding or damping element (85) as a truncated cone with a cross-section tapering in the direction of its securing surface, and the inner guiding or damping element (84) having an identical or slightly smaller cross-section.

52. Self-supporting box structure according to claim 1, characterised in that, between two transverse support elements (16, 17) disposed immediately adjacent to one another in the longitudinal direction of the box structure (3) there is arranged a crew cab (29) which is connected to the interior of the driver's cab (9) by an opening (81) in the end-face transverse support element (16) and a through opening (80) in the rear wall (79) of the driver's cab (9) and at least partially covering said opening (81).

53. Self-supporting box structure according to claim 1, characterised in that doors (43) with boarding ladders (178) are arranged in the side walls (38, 39) of the crew cab (29).

54. Self-supporting box structure according to claim 1, characterised in that the boarding ladder (178) is disposed in a cavity (47) extending over a length (20) of the arms (21) of the horizontal support element (12) in the direction of the support surface (19) inside the side wall (38, 39) of the box structure (3).

55. Self-supporting box structure according to claim 1, characterised in that a diagonal support element (25) is formed by a nodal element, which has an arm length facing the transverse support element (16 to 18) and the longitudinal support element (24) of at least 300 mm.

56. Self-supporting box structure according to claim 1, characterised in that, between the transverse support elements (16 to 18) and/or the vertical separating elements (26) and/or the horizontal separating elements (76) there are disposed shaped components (155 to 157), particularly three-dimensionally deformed sheet metal sections or 15 components of glass-fibre-reinforced plastic.

57. Self-supporting box structure according to claim 1, characterised in that the horizontal support element (12) comprises, in the longitudinal direction extending parallel to the end edges (123) between the base (54) and the arm (21), a plurality of components (129, 130), and in that these components (129, 130) are connected together preferably in the areas adjacent to the transverse support elements (16 to 18), and if necessary overlap one another.

58. Self-supporting box structure according to claim 1, characterised in that a pivotal axis (51) for a pivotal compartment (50) is connected to an securing plate or a support profile (172) and the securing plate or the support profile (172) is connected in a plurality of spaced apart areas by securing means (131) to a transverse support element (16 to 18) or glued over its entire surface.

59. Self-supporting box structure according to claim 1, characterised in that, in the region of the securing means (131), in particular in the countersunk guiding or reinforcing areas (32), there are arranged reinforcing elements (170) for receiving the securing means (131).

60. Self-supporting box structure according to of claim 1, characterised in that, in the region of the transverse support elements (16 to 18) and/or in the corner area between the transverse support elements (16 to 18) and the vertical separating elements (26), support profiles (172), particularly aluminium profiles and/or traversed or angled wall portions (169) of the transverse support elements (16 to 18) or vertical separating elements (26) are arranged, which are provided with receiving openings or retaining grooves (173) for receiving securing means (131) for pieces of equipment (77), particularly pivotal axes (51) of pivotal 5 compartments (50).

* * * * *